(12) United States Patent
Suemura

(10) Patent No.: US 7,372,806 B2
(45) Date of Patent: May 13, 2008

(54) FAULT RECOVERY SYSTEM AND METHOD FOR A COMMUNICATIONS NETWORK

(75) Inventor: Yoshihiko Suemura, Tokyo (JP)

(73) Assignee: NEC Corporation, Tokyo (JP)

( * ) Notice: Subject to any disclaimer, the term of this patent is extended or adjusted under 35 U.S.C. 154(b) by 1051 days.

(21) Appl. No.: 10/283,241

(22) Filed: Oct. 30, 2002

(65) Prior Publication Data

US 2003/0084367 A1   May 1, 2003

(30) Foreign Application Priority Data

Oct. 31, 2001   (JP) ............... 2001-334551

(51) Int. Cl.
*G01R 31/08* (2006.01)
*H04L 12/28* (2006.01)

(52) U.S. Cl. ............ 370/223; 370/404
(58) Field of Classification Search ........ 370/216–228; 714/2–4
See application file for complete search history.

(56) References Cited

U.S. PATENT DOCUMENTS

| | | | |
|---|---|---|---|
| 6,671,819 B1 * | 12/2003 | Passman et al. ........ | 714/4 |
| 6,741,553 B1 * | 5/2004 | Grenier .................. | 370/218 |
| 6,785,473 B1 | 8/2004 | Sasaki et al. | |
| 6,904,462 B1 * | 6/2005 | Sinha .................... | 709/226 |
| 6,934,248 B1 * | 8/2005 | DeBoer et al. ......... | 370/217 |
| 6,947,377 B1 * | 9/2005 | Shimano et al. ....... | 370/228 |
| 7,082,124 B1 * | 7/2006 | Katukam ................ | 370/357 |
| 7,126,908 B1 * | 10/2006 | Lu et al. ............... | 370/228 |

FOREIGN PATENT DOCUMENTS

| | | |
|---|---|---|
| JP | 7-264240 A | 10/1995 |
| JP | 11-191763 A | 7/1999 |
| JP | 2000-307620 A | 11/2000 |

OTHER PUBLICATIONS

Wu, "Chapter 3: Automatic Protection Switching and Dual Homing," Fiber Network Service Survivability, (1992) pp. 75-145, Artech House, Inc., Norwood, MA.

(Continued)

*Primary Examiner*—Chau Nguyen
*Assistant Examiner*—Marcus R Smith
(74) *Attorney, Agent, or Firm*—Foley & Lardner LLP

(57) ABSTRACT

In a communications network where first and second nodes are interconnected by communication links, a source node transmits a path setup message for requesting a traffic path to a destination node. Each of the first and second nodes includes routing control means for establishing first and second transport paths on a first fault recovery layer between the first and second nodes. The first node further includes a database for storing identities of the first and second paths as a single virtual link as viewed from the source node. The first node responds to the path setup message from the source node for establishing the traffic path on a second fault recovery layer through the first transport path. The first and second nodes accommodate the traffic path through the second transport path when the first transport path is not working properly.

44 Claims, 23 Drawing Sheets

OTHER PUBLICATIONS

Lang et al., "Generalized MPLS Recovery Mechanisms. draft-lang-ccamp-recorvery-01.txt," Internet Draft—Network Working Group, (Jul. 2001), 12 pages.
Draft-Suemura-gmpls-restoration-signaling-00.txt, 2000.
Draft-Suermura-protection-hierarchy-00.txt, 2000.
Draft-lang-ccamp-recovery-00.txt, 2000.
Draft-bala-protection-restoration-signaling-00.txt, 2000.
Draft-bala-restoration-signaling-00.txt, 2000.
GMPLS Path Recovery in a Multi-Layer Optical Network, Yoshihiko Suemura et al., IEICE Technical Report vol. 102 No. 102 CS2002-17, http://www.ieice.org, May 31, 2002.
Routing and Signaling Techiques for GMPLS Path Recovery, Yoshihiko Suemura et al., IEICE Technical Report vol. 102 No. 1 CS2002-5, http://www.ieice.org, Apr. 10, 2002.

* cited by examiner

FIG. 3A
PATH TABLE

| 21 | 22 | 23 | 24 | 25 | 26 | 27 | 28 | 29 | 30 | 31 | 32 | 33 |
|---|---|---|---|---|---|---|---|---|---|---|---|---|
| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RCVRY TYPE | ACTIVITY | ACCOM-MODATED PATH | TUNNEL ID |
| ----- | ----- | ----- | ----- | ----- | ----- | ----- | ----- | ----- | ----- | ----- | ----- | ----- |

(33: USED ONLY IN A NETWORK WHERE MANAGEMENT FUNCTIONS ARE DISTRIBUTED (FIG. 11))

FIG. 3B
SWITCH TABLE

| 41 | 42 | 43 | 44 | 45 |
|---|---|---|---|---|
| INPUT PORT ID | INPUT TIMESLOT ID (1ST POSITION) | OUTPUT PORT ID | OUTPUT TIMESLOT ID (1ST POSITION) | BAND-WIDTH |
| ----- | ----- | ----- | ----- | ----- |

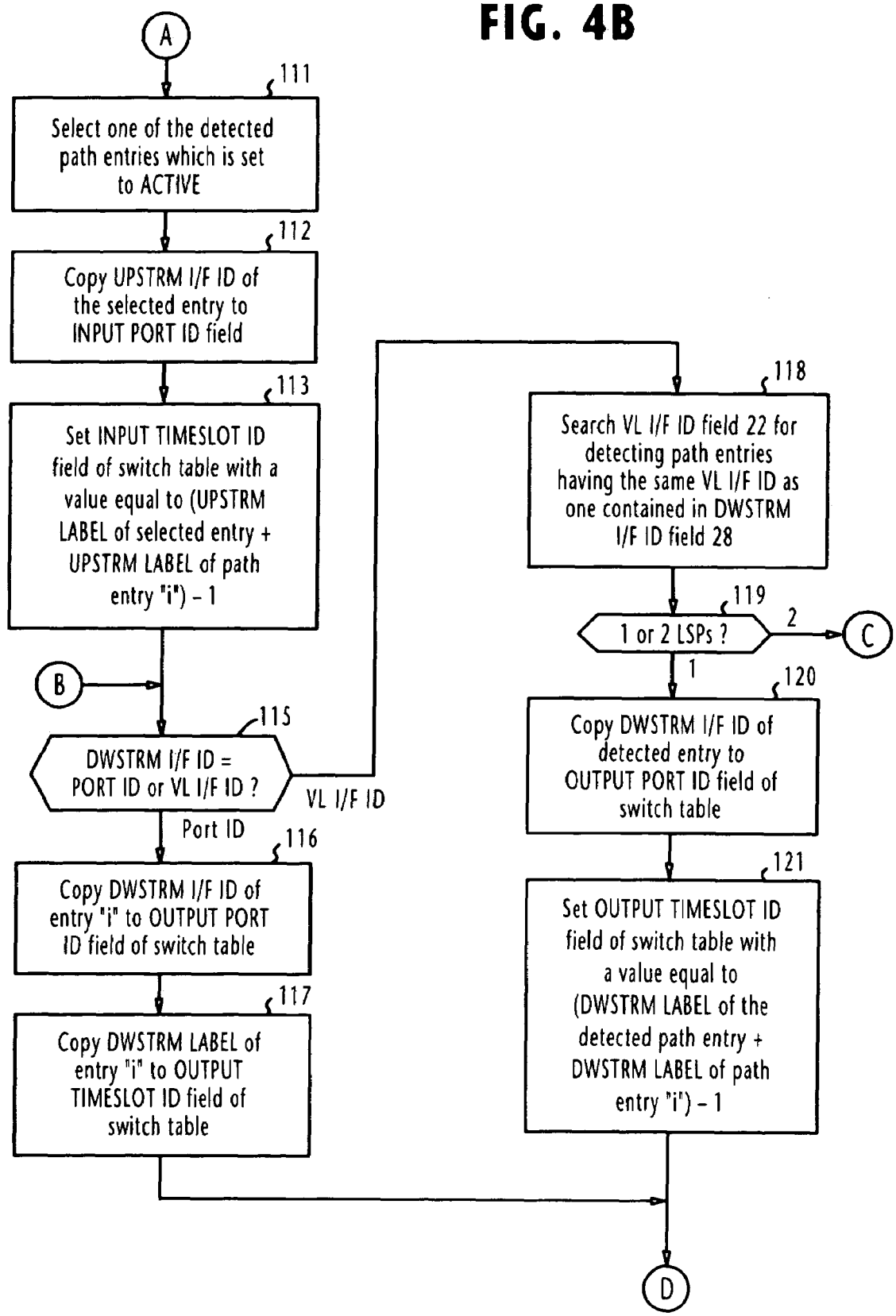

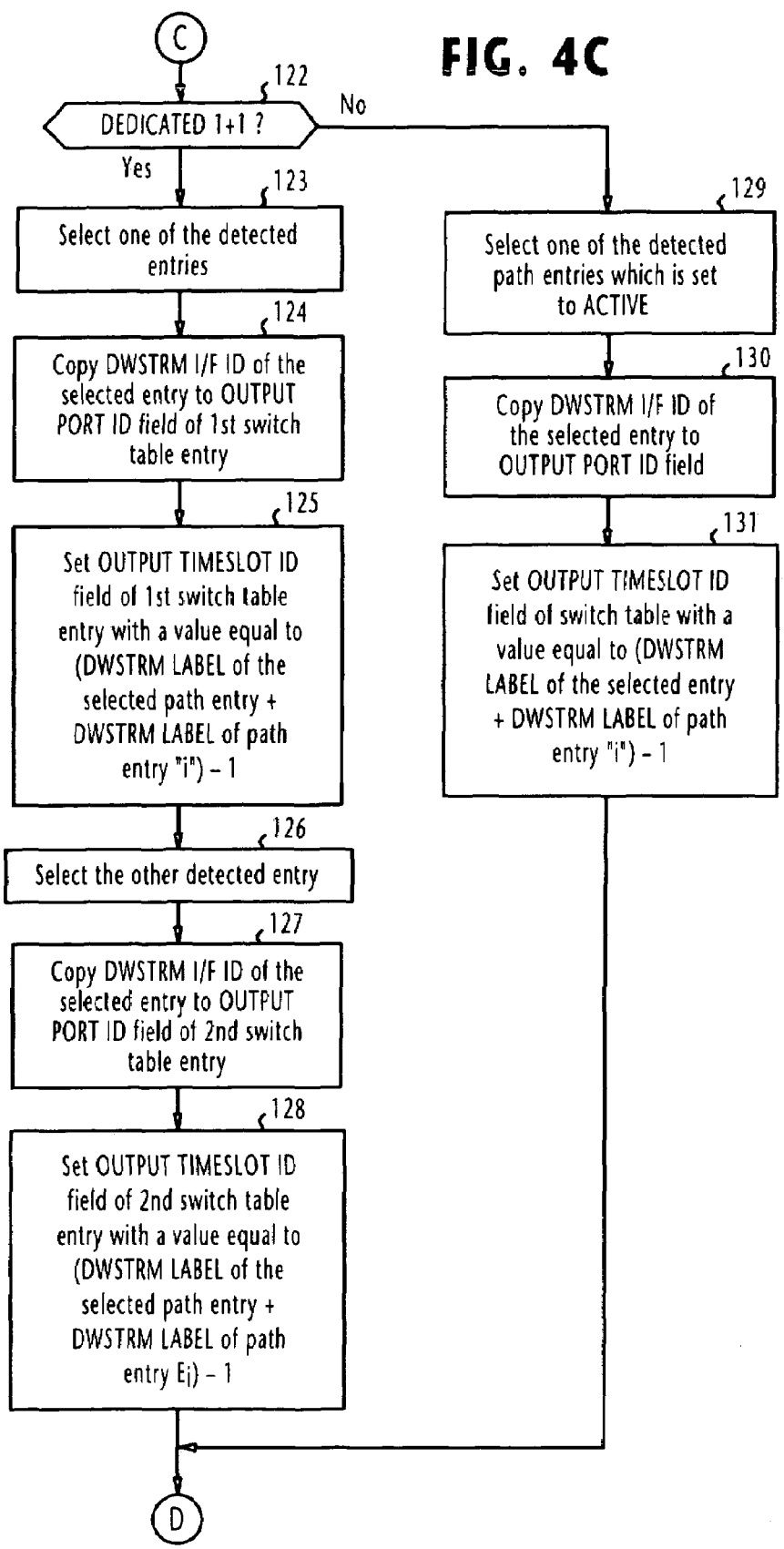

FIG. 5A

PATH TABLE OF NODE B

| 21 | 22 | 23 | 24 | 25 | 26 | 27 | 28 | 29 | 30 | 31 | 32 |
|---|---|---|---|---|---|---|---|---|---|---|---|
| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATHS |
| 10 | B-VL1 | STM-4 | | | | M | B6 | 1 | Dedicated 1+1 | Active | 12 |
| 11 | B-VL1 | STM-4 | | | | N | B7 | 1 | Dedicated 1+1 | Inactive | 12 |
| 12 | | STM-1 | A | B2 | 1 | C | B-VL1 | 1 | Unprotected | | |

FIG. 5B

SWITCH TABLE OF NODE B

| 41 | 42 | 43 | 44 | 45 |
|---|---|---|---|---|
| INPUT PORT ID | INPUT TIMESLOT ID | OUTPUT PORT ID | OUTPUT TIMESLOT ID | BAND-WIDTH |
| B2 | 1 | B6 | 1 | STM-1 |
| B2 | 1 | B7 | 1 | STM-1 |

FIG. 6A
PATH TABLE OF NODE M

| 21 PATH ID | 22 VL I/F ID | 23 BAND-WIDTH | 24 UPSTRM NODE ID | 25 UPSTRM INTER-FACE ID | 26 UPSTRM LABEL | 27 DWSTRM NODE ID | 28 DWSTRM INTER-FACE ID | 29 DWSTRM LABEL | 30 PATH RECOVERY TYPE | 31 ACTIVITY | 32 ACCOM-MODATED PATH |
|---|---|---|---|---|---|---|---|---|---|---|---|
| 10 | | STM-4 | B | M3 | 1 | C | M7 | 1 | Dedicated 1+1 | Active | 12 |

FIG. 6B
SWITCH TABLE OF NODE M

| 41 INPUT PORT ID | 42 INPUT TIMESLOT ID | 43 OUTPUT PORT ID | 44 OUTPUT TIMESLOT ID | 45 BAND-WIDTH |
|---|---|---|---|---|
| M3 | 1 | M7 | 1 | STM-4 |

FIG. 7A

PATH TABLE OF NODE N

| PATH ID (21) | VL I/F ID (22) | BAND-WIDTH (23) | UPSTRM NODE ID (24) | UPSTRM INTER-FACE ID (25) | UPSTRM LABEL (26) | DWSTRM NODE ID (27) | DWSTRM INTER-FACE ID (28) | DWSTRM LABEL (29) | PATH RECOVERY TYPE (30) | ACTIVITY (31) | ACCOM-MODATED PATHS (32) |
|---|---|---|---|---|---|---|---|---|---|---|---|
| 11 | | STM-4 | B | N2 | 1 | C | N6 | 1 | Dedicated 1+1 | Inactive | |

FIG. 7B

SWITCH TABLE OF NODE N

| INPUT PORT ID (41) | INPUT TIMESLOT ID (42) | OUTPUT PORT ID (43) | OUTPUT TIMESLOT ID (44) | BAND-WIDTH (45) |
|---|---|---|---|---|
| N2 | 1 | C6 | 1 | STM-4 |

FIG. 8A
PATH TABLE OF NODE C

| PATH ID (21) | VL I/F ID (22) | BAND- WIDTH (23) | UPSTRM NODE ID (24) | UPSTRM INTER- FACE ID (25) | UPSTRM LABEL (26) | DWSTRM NODE ID (27) | DWSTRM INTER- FACE ID (28) | DWSTRM LABEL (29) | PATH RECOVERY TYPE (30) | ACTIVITY (31) | ACCOM- MODATED PATHS (32) |
|---|---|---|---|---|---|---|---|---|---|---|---|
| 10 | C-VL1 | STM-4 | M | C2 | 1 | | | | Dedicated 1+1 | Active | 12 |
| 11 | C-VL1 | STM-4 | N | C3 | 1 | | | | Dedicated 1+1 | Inactive | 12 |
| 12 | | STM-1 | B | C-VL1 | 1 | D | C6 | 1 | Unprotected | | |

FIG. 8B
SWITCH TABLE OF NODE C

| INPUT PORT ID (41) | INPUT TIMESLOT ID (42) | OUTPUT PORT ID (43) | OUTPUT TIMESLOT ID (44) | BAND- WIDTH (45) |
|---|---|---|---|---|
| C2 | 1 | C6 | 1 | STM-1 |

FIG. 10A
PATH TABLE OF NODE C

| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATHS |
|---|---|---|---|---|---|---|---|---|---|---|---|
| 10 | C-VL1 | STM-4 | M | C2 | 1 | | | | Dedicated 1+1 | Inactive | 12 |
| 11 | C-VL2 | STM-4 | N | C3 | 1 | | | | Dedicated 1+1 | Active | 12 |
| 12 | | STM-1 | B | B-VL1 | 1 | D | C6 | 1 | Unprotected | | |

FIG. 10B
SWITCH TABLE OF NODE C

| INPUT PORT ID | INPUT TIMESLOT ID | OUTPUT PORT ID | OUTPUT TIMESLOT ID | BAND-WIDTH |
|---|---|---|---|---|
| C3 | 1 | C6 | 1 | STM-1 |

FIG. 12A
PATH TABLE OF NODE B

| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATHS | TUNNEL ID |
|---|---|---|---|---|---|---|---|---|---|---|---|---|
| 10 | B-VL1 | STM-4 | | | | M | B6 | 1 | Dedicated 1:1 | Active | 12 | B-1 |
| 11 | B-VL1 | STM-4 | | | | N | B7 | 1 | Dedicated 1:1 | Inactive | 12 | B-1 |
| 12 | | STM-1 | A | B2 | 1 | C | B-FA1 | 1 | Unprotected | | | |

FIG. 12B
SWITCH TABLE OF NODE B

| INPUT PORT ID | INPUT TIMESLOT ID | OUTPUT PORT ID | OUTPUT TIMESLOT ID | BAND-WIDTH |
|---|---|---|---|---|
| B2 | 1 | B6 | 1 | STM-1 |

FIG.13A

PATH TABLE OF NODE M

| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATH | TUNNEL ID |
|---|---|---|---|---|---|---|---|---|---|---|---|---|
| 10 | | STM-4 | B | M3 | 1 | C | M7 | 1 | Dedicated 1:1 | Active | 12 | B-1 |

FIG. 13B

SWITCH TABLE OF NODE M

| INPUT PORT ID | INPUT TIMESLOT ID | OUTPUT PORT ID | OUTPUT TIMESLOT ID | BAND-WIDTH |
|---|---|---|---|---|
| M3 | 1 | M7 | 1 | STM-4 |

FIG. 14A
PATH TABLE OF NODE N

| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATHS | TUNNEL ID |
|---|---|---|---|---|---|---|---|---|---|---|---|---|
| 11 | | STM-4 | B | N2 | 1 | C | N6 | 1 | Dedicated 1:1 | Inactive | | B-1 |

FIG. 14B
SWITCH TABLE OF NODE N

| INPUT PORT ID | INPUT TIMESLOT ID | OUTPUT PORT ID | OUTPUT TIMESLOT ID | BAND-WIDTH |
|---|---|---|---|---|
| | | | | |

FIG. 15A
PATH TABLE OF NODE C

| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATHS | TUNNEL ID |
|---|---|---|---|---|---|---|---|---|---|---|---|---|
| 10 | C-VL1 | STM-4 | M | C2 | 1 | | | | Dedicated 1:1 | Active | 12 | B-1 |
| 11 | C-VL1 | STM-4 | N | C3 | 1 | | | | Dedicated 1:1 | Inactive | 12 | B-1 |
| 12 | | STM-1 | B | B-VL1 | 1 | D | C6 | 1 | Unprotected | | | B-2 |

FIG. 15B
SWITCH TABLE OF NODE C

| INPUT PORT ID | INPUT TIMESLOT ID | OUTPUT PORT ID | OUTPUT TIMESLOT ID | BAND-WIDTH |
|---|---|---|---|---|
| C2 | 1 | C6 | 1 | STM-1 |

| INPUT PORT ID | INPUT TIMESLOT ID | OUTPUT PORT ID | OUTPUT TIMESLOT ID | BAND-WIDTH |
|---|---|---|---|---|
| C3 | 1 | C6 | 1 | STM-1 |

FIG. 16A
SWITCH TABLE OF NODE C

| INPUT PORT ID | INPUT TIMESLOT ID | OUTPUT PORT ID | OUTPUT TIMESLOT ID | BAND-WIDTH |
|---|---|---|---|---|
| N2 | 1 | N6 | 1 | STM-4 |

FIG. 16B
SWITCH TABLE OF NODE N

| INPUT PORT ID | INPUT TIMESLOT ID | OUTPUT PORT ID | OUTPUT TIMESLOT ID | BAND-WIDTH |
|---|---|---|---|---|
| B2 | 1 | B7 | 1 | STM-1 |

FIG. 16C
SWITCH TABLE OF NODE B

FIG. 19

PATH TABLE OF NODE D OF FIG. 18

| PATH ID | VL I/F ID | BAND-WIDTH | UPSTRM NODE ID | UPSTRM INTER-FACE ID | UPSTRM LABEL | DWSTRM NODE ID | DWSTRM INTER-FACE ID | DWSTRM LABEL | PATH RECOVERY TYPE | ACTIVITY | ACCOM-MODATED PATH | TUNNEL ID |
|---|---|---|---|---|---|---|---|---|---|---|---|---|
| 15 | D-VL1 | STM-4 | | | | O | W1 | D2 | Dedicated-1+1 | Active | 19 | D-1 |
| 16 | D-VL1 | STM-4 | | | | P | W2 | D3 | Dedicated 1+1 | Inactive | 19 | D-1 |
| 19 | | STM-1 | C | D1 | 1 | E | D-VL1 | 1 | Unprotected | | | D-2 |

FAULT RECOVERY SYSTEM AND METHOD FOR A COMMUNICATIONS NETWORK

BACKGROUND OF THE INVENTION

1. Field of the Invention

The present invention relates generally to fault recovery techniques for a communications network such as a mesh network.

2. Description of the Related Art

In the current communications network, a fault recovery system such as Automatic Protection Switching (APS) and ring fault recovery have been extensively used. APS is described in Chapter 3 of "Fiber Network Service Survivability," T. Wu, Artech House, 1992. Ring fault recovery is described in Chapter 4 of the same publication. APS concerns fault recovery for a link connecting adjacent nodes, and a working ring and a protection ring are provisioned in advance. When a failure occurs in the working ring, communication is restored by switching traffic to the protection ring. The ring fault recovery scheme is used in a mesh network where a plurality of nodes are interconnected by rings. The network is segmented into a number of rings. When a failure occurs in the network, fault recovery action is performed independently on a per ring basis. While the APS method is only capable of recovering a network from link failure, the ring fault recovery scheme is capable of recovering from both link failure and node failure.

Attention is recently focused on the mesh fault recovery scheme in which the whole network is treated as a single mesh, rather than as multiple rings. While in the ring fault recovery scheme a number of rings cannot share a common backup resource, the mesh fault recovery scheme allows any combination of multiple paths in a mesh network to share a common backup resource if they meet some criteria. Therefore, in most cases the mesh fault recovery method requires less backup resource as compared to the ring fault recovery scheme.

These fault recovery schemes are implemented primarily according to SDH (synchronous digital hierarchy) and SONET (synchronous optical network) standards. However, the recent tendency is toward integrating the control plane of MPLS (multi-protocol label switching) technology with SDH/SONET transport networks. Known as GMPLS (generalized MPLS), routers in the GMLS network make their forwarding decision according to timeslots, wavelengths or physical ports. Mesh fault recovery scheme can be implemented using the GMPLS technology.

In a GMPLS network, each node uses a routing protocol for advertising link-state information indicating the identity of its neighbor and its available network resource to every other nodes of the network. Each node has its own topology database in which the advertised link-state information is stored and maintained. When a path is established, the initiation node of the path references its topology database and performs a route calculation for a possible route to the termination node of the path. When a route is determined, the initiation node sends a signaling message along the route so that the message is able to reach every node on the route.

A mesh fault recovery using GMPLS is described in Internet draftlang-ccamp-recovery-01.txt submitted in IETF by Jonathan P. Lang. In this document, fault recovery is classified into path level recovery and span level recovery. The path-level fault recovery is performed by initiation and termination points of a path and the span-level fault recovery is performed between adjacent nodes of a link. Fault recovery mode is classified into a 1+1 protection mode in which the traffic is simultaneously sent to working and protection routes, a 1:1 protection mode in which the traffic is only sent to working route, and a shared mode such as 1:N and M:N protection modes. When a failure occurs on a path, the network performs a fault location process for locating the failure. The initiation node of the faulty path selects an alternate route so that data may be rerouted around the trouble spot. The alternate route may pass through a node that shares the troubled path.

If a failure occurs on an incoming link to a node where data is split into working and protection paths, the network first identifies the troubled link and then proceeds to perform a fault recovery operation on that faulty link in a span protection mode. If the working path fails, the network identifies the faulty path first and then proceeds to perform a path protection mode, in which the termination node of these paths switches to the protection path so that data is rerouted around the faulty spot. Because of the differences in fault recovery mode depending on the location of path failure, the fault locating process is an important requirement for the prior art communications network.

However, the need to perform a fault locating process places a burden on a network, particularly on optical networks where "optically transparency" is an important consideration for designing optical cross-connect systems. Specifically, if an optical network is required to identify the location of failure on an optical path, the optical path must be monitored at strategic points along the path and the number of such monitoring points would result in an add complexity to the design of optical system with an attendant increase in cost.

Another shortcoming of the prior art is that with the span-level recovery and path-level recovery schemes the network cannot recover from such a failure that occurs in an intermediate or transit node.

Additionally, in a large mesh network, many working and protection paths will be provided and configured in a complex pattern. The topology database of each node would be required to furnish the information as to the node identities and node functions of whether they are initiation or termination points of working and protection paths. Since the network topology tends to vary with time, the topology database must be updated in response to each topology variation. However, this is a formidable task to implement.

A further shortcoming of the prior art is that since the attributes of the path that carries user's traffic vary with time depending on which of the available routes it takes to destination, the prior art path protection method is complex from the view point of quality management for user services.

A still further shortcoming of the prior art is that it cannot perform fault recovery with a desired level of resource granularity. In a GMPLS network, in particular, a single optical link may carry sixty-four WDM channels each transporting sixty-four TDM channels of multiple packet transmission paths each. If the optical transmitter of certain wavelength should fail, sixty-four TDM paths will be lost. If the granularity of fault recovery is equivalent to a TDM path, recovery process will be repeated sixty-four times to restore all TDM paths. If fault recovery is performed at the granularity of a packet transmission path, the recovery process must be repeated a greater number of times. Since the recovery process of a single path involves exchanging of signaling messages, the signaling traffic would be enormous. Usually the signaling channel has a narrow bandwidth. Hence it takes a long recovery time. This is particularly true of shared path protection. On the other hand, if fault recovery is performed for a single TDM path failure at the granularity of a wavelength channel, the process may be simple and free from overwhelming signaling traffic. However, sixty-three other TDM paths would also be switched over to backup network resource, resulting in a substantial wastage of network resource.

Additionally, in a multi-domain network, precision topology data is not exchanged between different domains. There exists a need for a mechanism to implement a fault recovery system that enables each domain to collaborate in a consistent manner when the network is affected by an inter-domain path failure.

SUMMARY OF THE INVENTION

It is therefore an object of the present invention to provide a communications network having a fault recovery mechanism that solves the prior art problems and shortcomings.

According to a first aspect of the present invention, there is provided a communications network comprising first and second nodes interconnected by communication links. A traffic path is established between a source node and a destination node. Each of the first and second nodes includes routing control means for establishing first and second transport paths on a first fault recovery layer between the first and second nodes. The first node further includes a database for storing identities of the first and second transport paths as a single virtual link as viewed from the source node. The first node responds to the path setup message from the source node for establishing the traffic path on a second fault recovery layer through the first transport path, and accommodates the traffic path on the second fault recovery layer through the second transport path when the first path is not working properly. Preferably, the first and second fault recovery layers are hierarchically structured in such a relationship that no contention occurs between the first and second fault recovery layers when a failure occurs in said first and second transport paths. The bandwidth of each of the first and second transport paths is equal to or greater than the bandwidth of the traffic path.

According to a second aspect, the present invention provides a multi-domain communications network comprising a plurality of network domains interconnected by inter-domain links, each of the network domains including first and second nodes interconnected by inter-node links. A traffic path is established between a source node and a destination node. The first node of each of the domains establishing first and second parallel transport paths on a first fault recovery layer to the second node of the domain and including a database for storing identities of the first and second parallel transport paths as a single virtual link as viewed from the source node, and accommodating the traffic path on a second fault recovery layer through the first transport path of the domain, the first and second nodes of each of the domains accommodating the traffic path on the second fault recovery layer through the second transport path of the domain when the first transport path of the domain is not working properly.

Preferably, each node of the multi-domain communications network comprises a first table memory for storing routing data of the firsts and second transport paths and the traffic path, a second table memory for storing switching data derived from the routing data, a switch for terminating the first and second transport paths, and a controller for establishing a connection in the switch according to the switching data so that the traffic path is accommodated in the first transport path. The controller responds to an occurrence of a failure in the first transport path for updating the routing data, and then updates the switching data according to the updated routing data and reestablishes a connection in the switch according to the updated switching data so that the traffic path is accommodated in the second transport path. The controller derives the switching data from the routing data by translation from a control plane of the network to a transport plane of the network. When a failure is detected in the first transport path, the routing data is updated to reflect the path failure and the switching data is updated according to the updated routing data. The updated switching data is used to reestablish the connection.

According to a third aspect, the present invention provides a fault recovery method for a communications network in which first and second nodes are interconnected by communication links. The method comprises the steps of establishing first and second parallel transport paths on a first fault recovery layer between the first and second nodes, storing identities of the first and second parallel transport paths in a database as a single virtual link as viewed from a source node, establishing a traffic path between a source node and a destination node, accommodating the traffic path on a second fault recovery layer through the first transport path, and monitoring the first path, at the second node, and accommodating the traffic path on the second fault recovery layer through the second transport path when a failure is detected in the first transport path.

According to a fourth aspect of the present invention, there is provided a fault recovery method for a multi-domain communications network, wherein the network comprises a plurality of network domains interconnected by inter-domain links and wherein each of the network domains includes first and second nodes interconnected by inter-node links. The method comprises the steps of establishing, in each of the domains, first and second parallel transport paths on a first fault recovery layer from the first node to the second node, storing identities of the first and second parallel transport paths as a single virtual link in a database as viewed from the source node, establishing a traffic path between a source node and a destination node, establishing the traffic path on a second fault recovery layer through the first transport path of the domain in response to the path setup message, and accommodating the traffic path in the second transport path of one of the domains when the first transport path of the domain is not working properly.

BRIEF DESCRIPTION OF THE DRAWIGNS

The present invention will be described in detail further with reference to the following drawings, in which:

FIGS. 3A and 3B are illustrations of a path table and a switch table respectively defined in a memory device of each network node;

FIGS. 4A, 4B and 4C are flowcharts of the operation of each node controller for translating routing information contained in the path table into switching information which is set into the switch table;

FIGS. 5A and 5B are illustrations of examples of the path table and switch table of node B, respectively, according to the configuration of FIG. 2;

FIGS. 6A and 6B are illustrations of examples of the path table and switch table of node M, respectively, according to the configuration of FIG. 2;

FIGS. 7A and 7B are illustrations of examples of the path table and switch table of node N, respectively, according to the configuration of FIG. 2;

FIGS. 8A and 8B are illustrations of examples of the path table and switch table of node C, respectively, according to the configuration of FIG. 2;

FIGS. 10A and 10B are illustrations of the path table and switch table of node C, respectively, when a failure is detected in the working path;

FIGS. 12A and 12B are illustrations of examples of the path table and switch table of node B, respectively, of the network of FIG. 11;

FIGS. 13A and 13B are illustrations of examples of the path table and switch table of node M, respectively, of the network of FIG. 11;

FIGS. 14A and 14B are illustrations of examples of the path table and switch table of node N, respectively, of the network of FIG. 11;

FIGS. 15A and 15B are illustrations of examples of the path table and switch table of node C, respectively, of the network of FIG. 11;

FIGS. 16A, 16B and 16C are illustrations of updated switch tables of nodes C, N and B, respectively, when a failure is detected in the working path of the network of FIG. 11;

Figure 18:
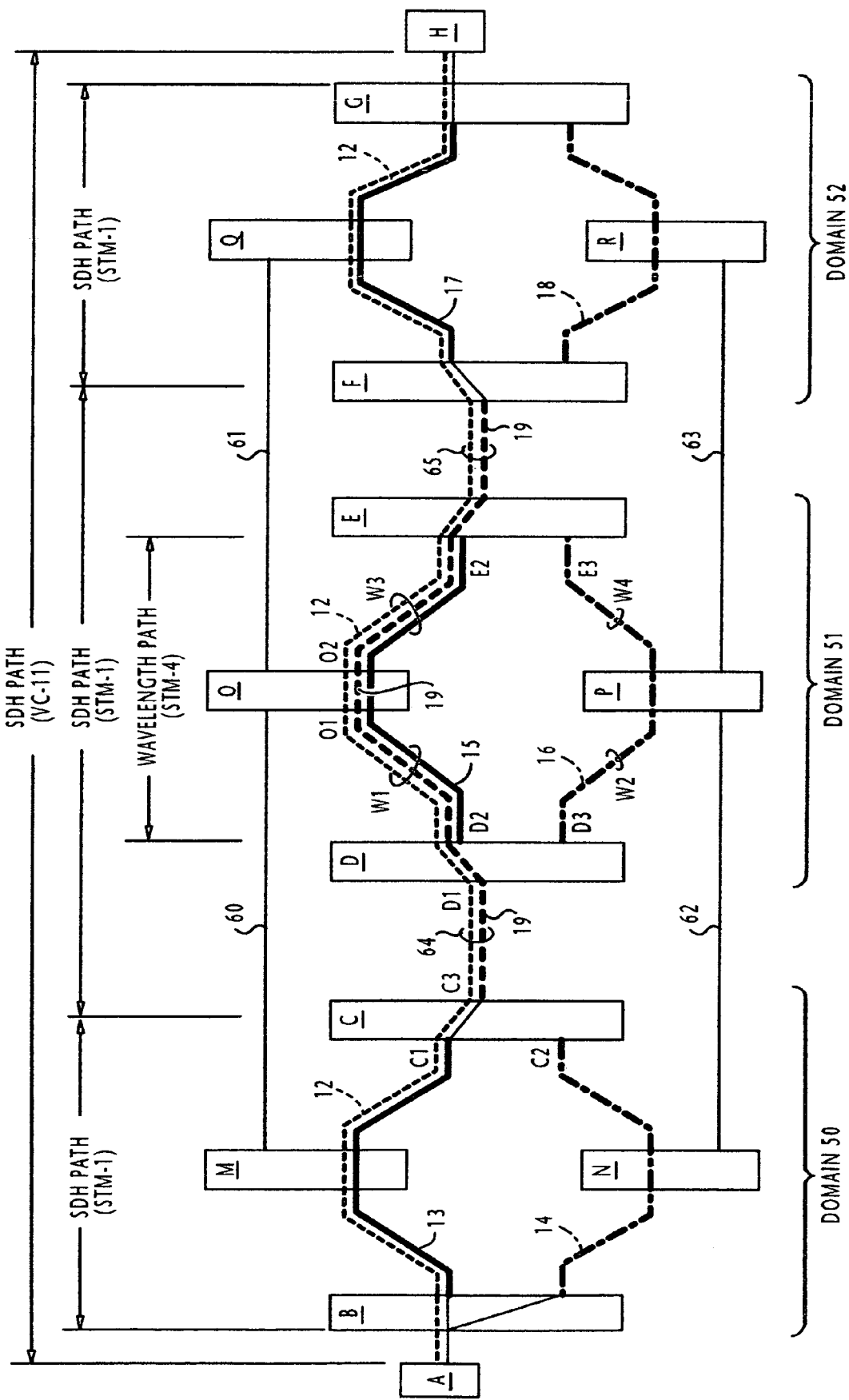
FIG. 18 is a block diagram of a multi-domain communications network in which wavelength and SDH layers are formed in a hierarchical structure.
Figure 20:
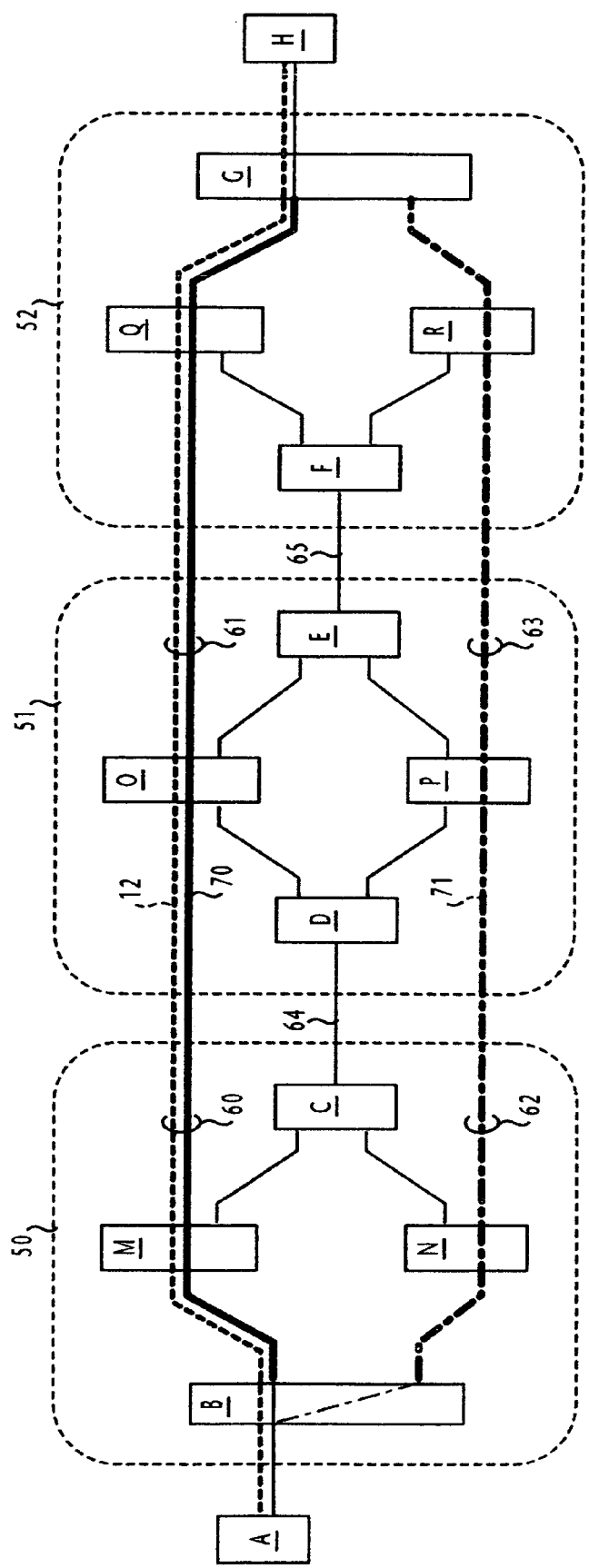
Figure 21:
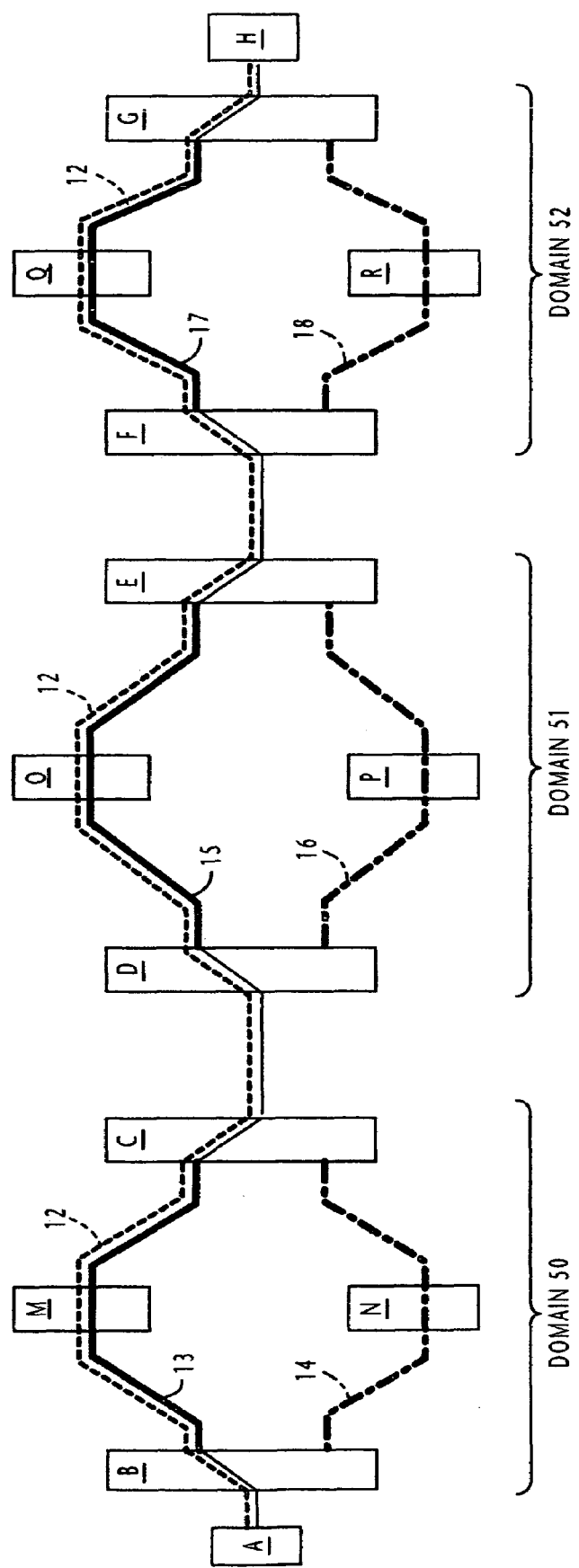

FIG. 19 is an illustration of one example of the path table of node D of FIG. 18; and FIG. 20 is a block diagram of a multi-domain communications network for illustrating routes which are taken when a desired path is not discovered in the network of FIG. 18; and FIG. 21 is a block diagram of a multi-domain communications network in which inter-domain links are specified according to requested fault recovery mode.

DETAILED DESCRIPTION

Figure 1:
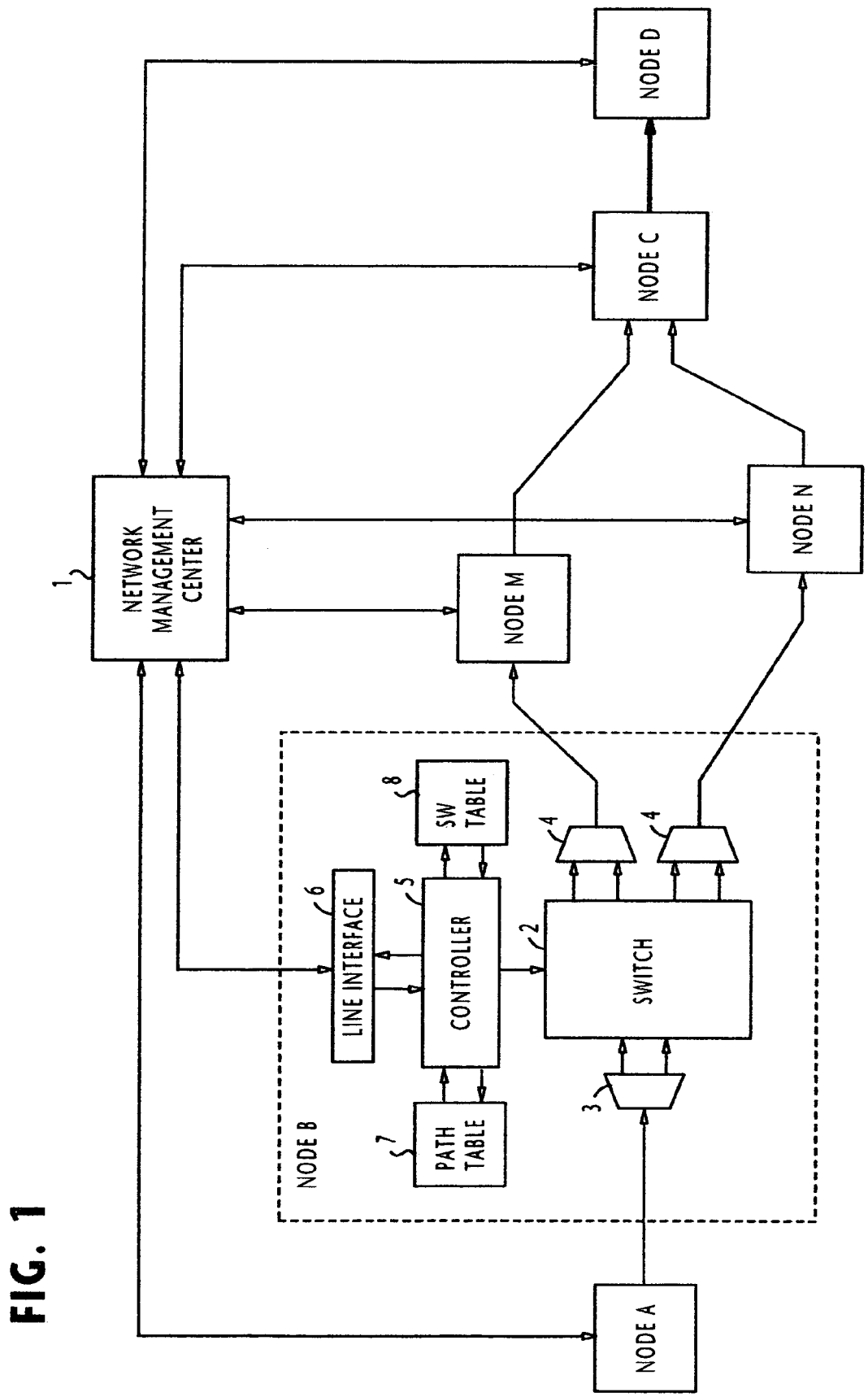
FIG. 1 is a block diagram of a communications network according to an embodiment of the present invention, in which a network management center is provided for centralized control.

Referring now to FIG. 1, there is shown a SDH (Synchronous Digital Hierarchy) communications network according to a first embodiment of the present invention in which the GMPLS (Generalized Multi-Protocol Label Switching) protocol is employed. The network is comprised of a plurality of SDH cross-connect nodes A, B, C, D, M and N of similar configuration, which are connected to a network management center 1 via control channels. SDH signals transmitted between the nodes are multiplexed on different wavelengths and transmitted as a WDM signal. For simplicity, only one direction of transmission is shown.

As illustrated in FIG. 1 as a representative node, the node B includes a cross-connect switch 2 which may be a combination of one or more time division switching stages and one or more space division switching stages. An incoming WDM signal (two STM-4 signals, for example) from the node A is supplied to a wavelength-division demultiplexer 3, where the WDM signal is demultiplexed into STM-4 signals and supplied to input ports of the switch 2. In the switch 2, the time slots of an STM-4 signal supplied to one of its input ports are interchanged in the time division stages and switched on a per-slot basis through the space division stages to a desired output port. Therefore, the cross-connect switch 2 is able to switch an STM-1 signal supplied to any of its input ports on any incoming timeslot to any of its output ports on any outgoing timeslot. Obviously, the switch 2 may be controlled to establish a connection that directly transfers an STM-4 signal from one input port to any output port.

A controller 5 is provided for controlling the switch 2 to establish connections in accordance with switching data (timeslot IDs and port IDs) stored in a switch table S. As will be described, the switching data is derived from routing data (attributes of paths) stored in a path table 7.

Each port of the switch 2 is identified by a unique port ID and each incoming and outgoing STM-1 signal can be identified by one of four timeslot IDs of an STM-4 signal.

The output ports of optical switch 2 are connected to wavelength-division multiplexers 4, where outgoing STM-4 signals are wavelength-multiplexed onto a WDM signal comprising two STM-4 signals of different wavelength channels. The WDM signals are transmitted over the optical links that connect the node B to the transit nodes M and N, respectively.

Controller 5 of each node is connected to the network management center 1 via a line interface 6 to exchange routing information for creating a topology database in the management center 1 and setting the path table 7 of each node with routing data.

Network management center 1 initially sends routing messages to nodes B, M, N and C to establish transport (label switched) paths between nodes B and C and then sends a routing message to node A to establish a traffic path through one of these transport paths from node A to node D. It is assumed that 1+1 path protection is performed. The bandwidth of each of the transport paths is equal to or greater than the bandwidth of the traffic path.

For the purpose of explanation, it is assumed that the network is configured so that the functions of the management center 1 are distributed to all network nodes. Initially, the node B performs a first route calculation to find an STM-4 route to node C via transit node M and sends a signaling message to node C via node M to establish a first transport path 10. Node B then performs a second route calculation to find an alternate STM-4 route to node C via node N and sends a signaling message to node C via node N to establish a second transport path 11. Then, the node B advertises the first and second transport paths 10 and 11 as a single "logical (virtual) link" to the network, using a routing protocol.

Every other nodes of the network store this information in their topology database. When the ingress node A performs a calculation for a route to the egress node D with a bandwidth smaller than that of transport paths 10 and 11, an STM-1 traffic path 12 may be found through the virtual link because of its presence in the topology database. The second transport path 11 may be used as a protection transport path as a backup resource for the working transport path 10.

Transport paths 10 and 11 are established on a first fault recovery layer and the traffic path 12 is established on a second fault recovery layer. The first and second fault recovery layers are hierarchically structured with respect to each other. Preferably, the first and second fault recovery layers are structured so that there is no contention between them when a failure occurs in one of the first and second transport paths 10 and 11.

Note that, in FIG. 1, the network management center 1 performs the above-mentioned node functions. By treating the first and second transport paths 10, 11 as a single virtual link, the path protection method is simplified from the view point of quality management for user services.

Figure 2:
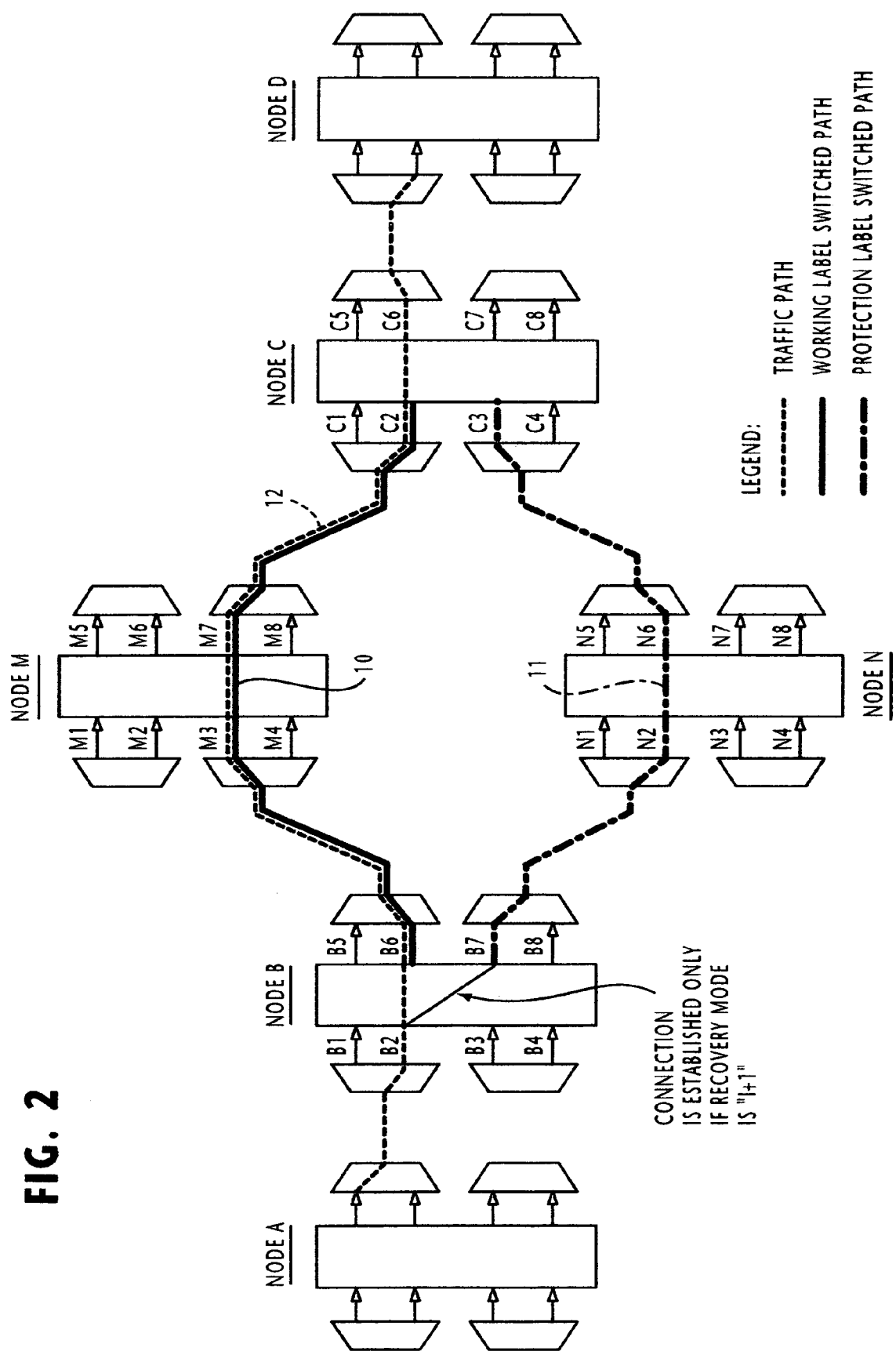
FIG. 2 is a block diagram of the network in which transport (label switched) paths and a traffic path are illustrated.

As shown in FIG. 2, the first and second transport paths 10 and 11 are established between the node B (initiation node) and the node C (termination node) as transport paths, with the first and second paths passing through transit nodes M and N, respectively. Each of these first and second paths has a traffic-carrying capacity equivalent to a wavelength resource. Network management center 1 sets the first and second transport paths 10, 11 as a single virtual link in its topology database so that the virtual link can be used as a hierarchically distinct from the view point of fault recovery with respect to the fault recovery of the traffic path 12. Based on this topology data, the center 1 performs a route calculation for a path from node A to node D and establishes a traffic path 12 via the virtual link. The path recovery type of transport paths 10 and 11 are dedicated 1+1 and the path recovery type of traffic path 12 is unprotected. Therefore, the traffic path 12 is not recovered from failure. Because of the dedicated 1+1 fault recovery, the node B establishes connections in its cross-connect switch 2 so that the traffic signal on the path 12 is simultaneously applied to both transport paths 10 and 11, whose downstream ends respectively appear at ports C2 and C3 of node C. Using the first and second paths 10, 11 as working and protection paths, respectively, the node C establishes a connection between the port C2 and port C6 which leads to the node D, Leaving the port C3 unconnected. Therefore, the traffic path 12 is accommodated in the working path 10 to transfer the traffic signal via the transit node M. In this way, the first and second paths 10 and 11 are hierarchically structured on a different fault recovery layer from that of the traffic path 12.

As shown in FIG. 3A, the path table 7 has a plurality of entries 20 for entering attributes of a plurality of paths. Each path table entry, which is identified by a path ID field 21, is divided into fields 22 through 33 for setting the values of a virtual link interface ID, bandwidth, upstream node ID, upstream interface ID, upstream label, downstream node ID, downstream interface ID, downstream label, path recovery type, activity (active or inactive), accommodated path and tunnel ID (which is only used for distributed network). As will be described later, the attribute data of the path table 7 are used for setting the switch table 8 with data necessary for the controller 5 to perform switching on the incoming SDH signals transported on a WDM channel.

The virtual link interface (I/F) ID 22 field of each path entry is used to indicate whether the path of that entry is a transport path or not. Since the transport paths 10 and 11 are visible as a single virtual (or logical) link from nodes other than nodes B and C, a common virtual link interface ID is given to the paths 10, 11 and no VL I/F ID is given to the traffic path 12.

Bandwidth field 23 of each path entry indicates the bandwidth of its path. In a typical example, STM-4 (equivalent to 622 Mbps) are given to paths 10 and 11 and STM-1 (equivalent to 155 Mbps) is given to path 12. The upstream node ID field 24 of each path entry indicates the identity of an adjacent node on the upstream side of the local node, and the downstream node ID field 27 indicates the identity of a downstream-side adjacent node of the local node. Upstream and downstream interface ID fields 25 and 28 of each path table entry are used to indicate the port ID (i.e., identity of a physical link) or VL interface ID of the path on the upstream and downstream sides of the local node, respectively. Note that the port ID has the same granularity as that of physical link, and hence it is equivalent to the granularity of wavelength.

Since the nodes of the present invention do not recognize packet or cell boundaries, and hence their forwarding decision is based on timeslots, the upstream and downstream label fields 26 and 29 of each path entry are used to indicate the timeslot ID on the upstream and downstream sides of the local node, respectively. If a plurality of timeslots exist in a path such as STM-4, the first timeslot ID of the four timeslots of STM-4 is indicated.

Path recovery type field 30 of each path table entry is used to indicate the type of fault recovery of the path. The path recovery type of each of the transport paths 10 and 11 is either DEDICATED 1+1, DEDICATED 1:1 or SHARED. Since the traffic path 12 is in itself not recovered, the path recovery type of this path 12 is indicated as UNPROTECTED.

The activity field 31 of each path table entry is used to indicate whether the path is active or inactive. The accommodated path field 32 of each entry is used to indicate the identity of a path which is accommodated in the transport path of the entry. The identity of the traffic path 12 will be indicated in both entries of transport paths 10 and 11.

Although not shown in FIG. 3A, each entry of the path table includes an additional field for indicating whether the path is a working or a protection path, regardless of whether the path is "active" or "inactive". In the illustrated embodiment, the transport paths 10 and 11 are working and protection paths, respectively.

Switch table 8, shown in FIG. 3B, has a plurality of entries 40 each having a plurality of fields 41 to 45 for setting an input port ID, an input timeslot ID, an output port ID, an output timeslot ID and the bandwidth. Switching data to be stored in the switch table 8 of each node will be derived from the routing data of path table 7 by having the controller 5 execute the routine illustrated in the flowcharts of FIGS. 4A to 4C.

Examples of the path table 7 of nodes B, M, N and C are illustrated in FIGS. 5A, 6A, 7A and 8A, respectively, and examples of the switch table 8 of these nodes are shown in FIGS. 5B, 6B, 7B and 8B, respectively.

Figure 4A:
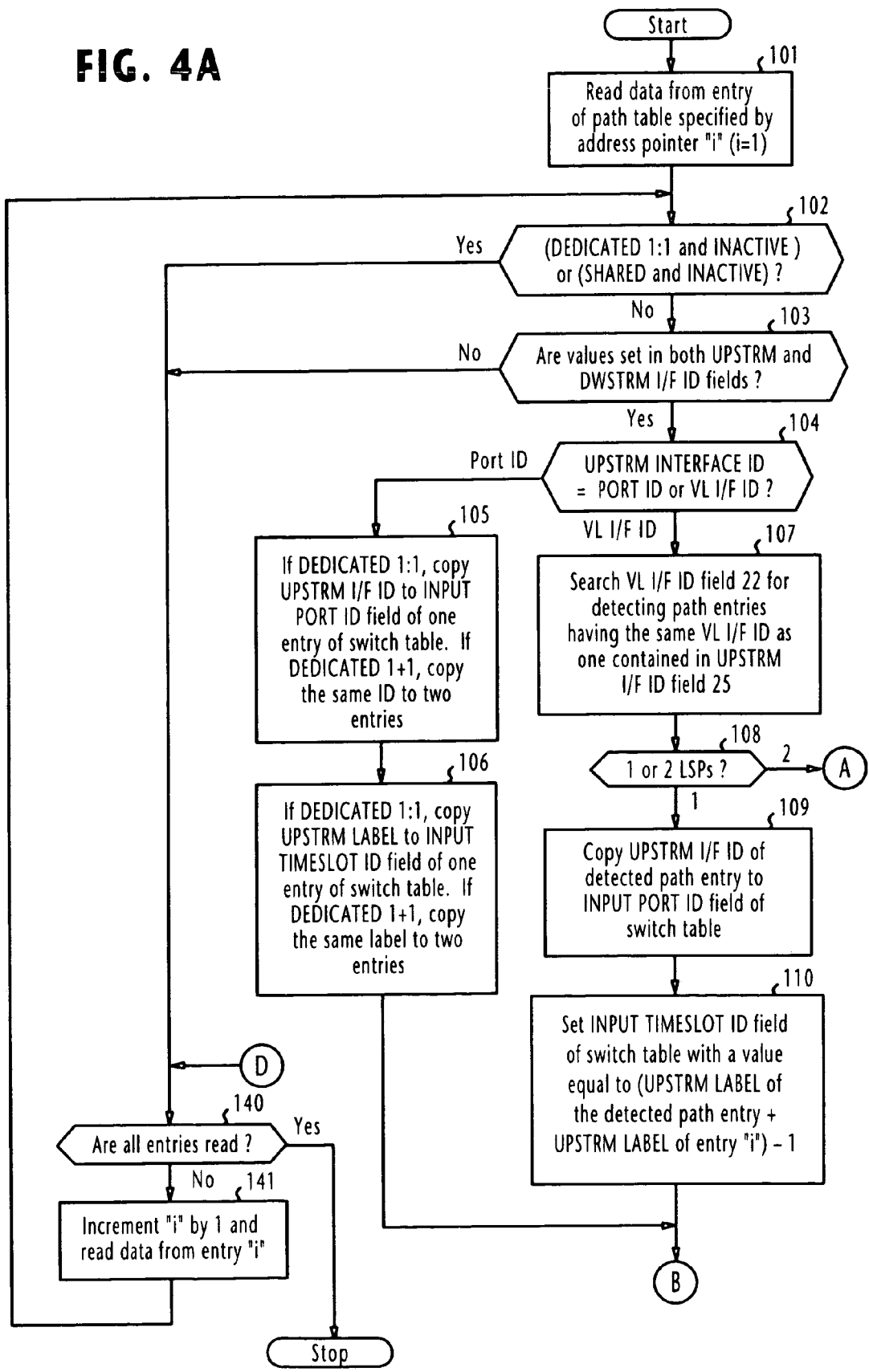

The following is a description of operation of the controller 5 according to the flowcharts of FIGS. 4A to 4C for creating switching data from the routing data of path table 7 and storing the switching data into the switch table 8.

At step 101, the controller 5 reads data from an entry specified by an address pointer "i" (where i is initially equal to 1) of path table 7 and determines, at step 102, whether its fault recovery and activity fields 29 and 30 indicates that (DEDICATED 1:1 and INACTIVE) or (SHARED and INACTIVE). If this is the case, flow proceeds to step 140 to check to see if all entries have been read. If not flow proceeds to step 141 to increment the address pointer "i" by one, reads data from the next path table entry and returns to step 102.

If the decision at step 102 is negative, flow proceeds to step 103 to check to see if values are set in both UPSTREAM and DOWNSTREAM I/F ID fields 24, 27. If no values are set in both of these fields, steps 140 and 141 will be repeated to move the address pointer to the next path entry. Therefore, the first and second entries of the node-B path table 7 will be ignored and the address pointer will move to the third path entry (FIG. 5A).

If values are set in both UPSTREAM and DOWNSTREAM I/F ID fields 24 and 27, flow proceeds from step 103 to step 104 to determine whether the UPSTREAM I/F ID is equal to a PORT ID or VL I/F ID. If the UPSTREAM I/F ID is equal to a PORT ID, flow proceeds from step 104 to step 105 to copy the UPSTREAM I/F ID of current entry "i" to the INPUT PORT ID field 41 of one entry of switch table if the path recovery type is dedicated 1:1 or SHARED_and additionally copy the same ID to the same field 41 of a second entry of the switch table if the path recovery type is dedicated 1+1. At step 106, the UPSTREAM LABEL of current entry "i" is copied to the INPUT TIMESLOT ID field 42 of one entry of switch table if the path recovery type of this path is dedicated 1:1 or SHARED and additionally copied to the same field 42 of a second entry of the switch table if the path recovery type is dedicated 1+1.

Therefore, as shown in FIGS. 5A and 5B, when the third path entry (i.e., traffic path 12) of the path table 7 of LSP-initiation node B is processed, the upstream interface ID=B2 is copied to the INPUT PORT ID field 41 of two entries of the node-B switch table 8. In the transit nodes M and N, the PORT IDs M3 and N2 are copied to the INPUT PORT ID fields 41 of one entry of their switch tables and in the same entry the UPSTREAM LABEL=1 is copied from the path table to INPUT TIMESLOT ID field 42 of the switch table (see FIGS. 6A, 6B, 7A, 7B).

If the decision at step 104 indicates that the UPSTREAM I/F ID of the current entry is equal to VL I/F ID, flow proceeds to step 107 to search the VL I/F ID field 22 for detecting path entries having the same VL I/F ID as one contained in the UPSTREAM I/F ID field 25 and determines the number of detected transport paths (step 108).

This situation occurs in node C. As shown in FIG. 8A, the path table of node C indicates that its UPSTREAM I/F ID 25 contains C-VL1. Therefore, flow proceeds from step 104 to step 107 in which the controller 5 detects two path entries in the VL I/F ID field 22 having the same C-VL1 as one contained in the upstream interface ID field 25 and determines that there are two transport paths 10 and 11 (step 108).

If only one transport path is detected, flow proceeds from step 108 to step 109 to copy the UPSTREAM I/F ID of the detected path entry to the INPUT PORT ID field 41 of the switch table. At step 110, the controller sets the INPUT TIMESLOT ID field 42 with a value equal to (UPSTREAM LABEL of the detected entry plus UPSTREAM LABEL of current entry) minus 1.

If the number of the detected paths (i.e., path entries) is two, flow proceeds from step 108 to step 111 (see FIG. 4B) to select one of the detected entries which is set to ACTIVE state and copy the UPSTREAM I/F ID of the selected entry to the INPUT PORT ID field 41 of switch table (step 112). The INPUT TIMESLOT ID filed 42 of switch table is set with a value equal to (the UPSTREAM LABEL of the selected path entry plus UPSTREAM LABEL of current entry) minus 1 (step 113).

Therefore, in the LSP-termination node C, the UPSTREAM I/F ID=C2 of the detected path entry (i.e., path 10) is copied to the INPUT PORT ID field 41 of the switch table, and a LABEL=1 is obtained by the calculation and set into the INPUT TIMESLOT ID field 42, as shown in FIGS. 8A and 8B.

Following the execution of step 106, 110 or 114, the controller proceeds to step 115 to determine if the DOWNSTREAM I/F ID is equal to PORT I) or VL I/F ID. If DOWNSTREAM I/F ID is equal to PORT ID, the DOWNSTREAM I/F ID of the current path entry is copied to the OUTPUT PORT ID field 43 (step 116) and the DOWNSTREAM LABEL of the current path entry is copied to the OUTPUT TIMESLOT ID field 44 (step 117).

In the transit nodes M and N, the PORT IDs=M7 and =N6 are copied to the OUTPUT PORT ID fields 43 of their switch tables and a LABEL=1 is obtained by the calculation and set into their OUTPUT TIMESLOT ID field 44 (see FIGS. 6A, 6B, 7A, 7B). In the same way, the LSP-termination node C, the PORT ID=C6 is copied from the DOWNSTREAM I/F ID field 28 to the OUTPUT PORT ID fields 43 and a LABEL=1 is obtained by the calculation and set into the OUTPUT TIMESLOT ID field 44 (see FIGS. 8A, 8B).

If the DOWNSTREAM I/F ID is equal to VL I/F ID (step 115), the VL I/F field 22 is searched (at step 118) for detecting path entries having the same VL I/F ID as the one contained in the DOWNSTREAM I/F ID field 28. If only one path entry is detected (step 119), the DOWNSTREAM I/F ID of the detected path entry is copied to the OUTPUT PORT ID field 43 (step 120) and the OUTPUT TIMESLOT ID field 44 is set with a value equal to (DOWNSTREAM LABEL of the detected path entry plus DOWNSTREAM LABEL of the current path entry) minus 1 (step 121).

If two path entries are detected at step 119, flow proceeds to step 122 (FIG. 4C) to determine whether the path recovery type of the paths is DEDICATED 1+1. If this is the case, one of the path entries detected at step 118 is selected (step 123) and the DOWNSTREAM I/F ID of the selected path entry is copied to the OUTPUT PORT ID field 43 of a first entry of switch table 8 (step 124). At step 125, the OUTPUT TIMESLOT ID field 44 of the first switch-table entry is set with a value equal to (DOWNSTREAM LABEL of the selected path entry plus DOWNSTREAM LABEL of the current path entry) minus 1. In a similar manner, the other of the detected path entries is then selected (step 126) and the DOWNSTREAM I/F ID of the selected path entry is copied to the OUTPUT PORT ID field 43 of a second entry of switch table 8 (step 127). At step 128, the OUTPUT TIMESLOT ID field 44 of the second switch-table entry is set with a value equal to (DOWNSTREAM LABEL of the selected path entry plus DOWNSTREAM LABEL of the current path entry) minus 1.

Therefore, in the LSP-initiation node B, DOWNSTREAM I/F IDs=B6 and =B7 are respectively copied to the OUTPUT PORT ID fields 43 of the first and second entries of switch table 8 and a LABEL=1 is obtained by the calculation and set into the OUTPUT TIMESLOT ID field 44 of both switch table entries, as shown in FIGS. 5A and 5B.

If the decision at step 122 is negative, flow proceeds to step 129 to select one of the detected path entries which is set ACTIVE. The DOWNSTREAM I/F ID of the selected path entry is copied to the OUTPUT PORT ID field 43 (step 130), and the OUTPUT TIMESLOT ID field 44 is set with a value equal to (DOWNSTREAM LABEL of the selected path entry plus DOWNSTREAM LABEL of the current path entry) minus 1 (step 131).

Upon completion of step 117, 121, 128 or 131, flow returns to step 140 (FIG. 4A) to repeat the process until all path entries are processed.

In this way, the switch tables of all network nodes are set with switching data. All controllers 5 of the network operate according to the switching data stored in their respective switch tables 8 for establishing a connection in the associated cross-connect switches 2. During network operation, the termination node of a transport path constantly monitors the path for detecting a failure. If the termination node receives a path AIS (alarm indication signal) signal, there is a failure on the path.

Figure 9:
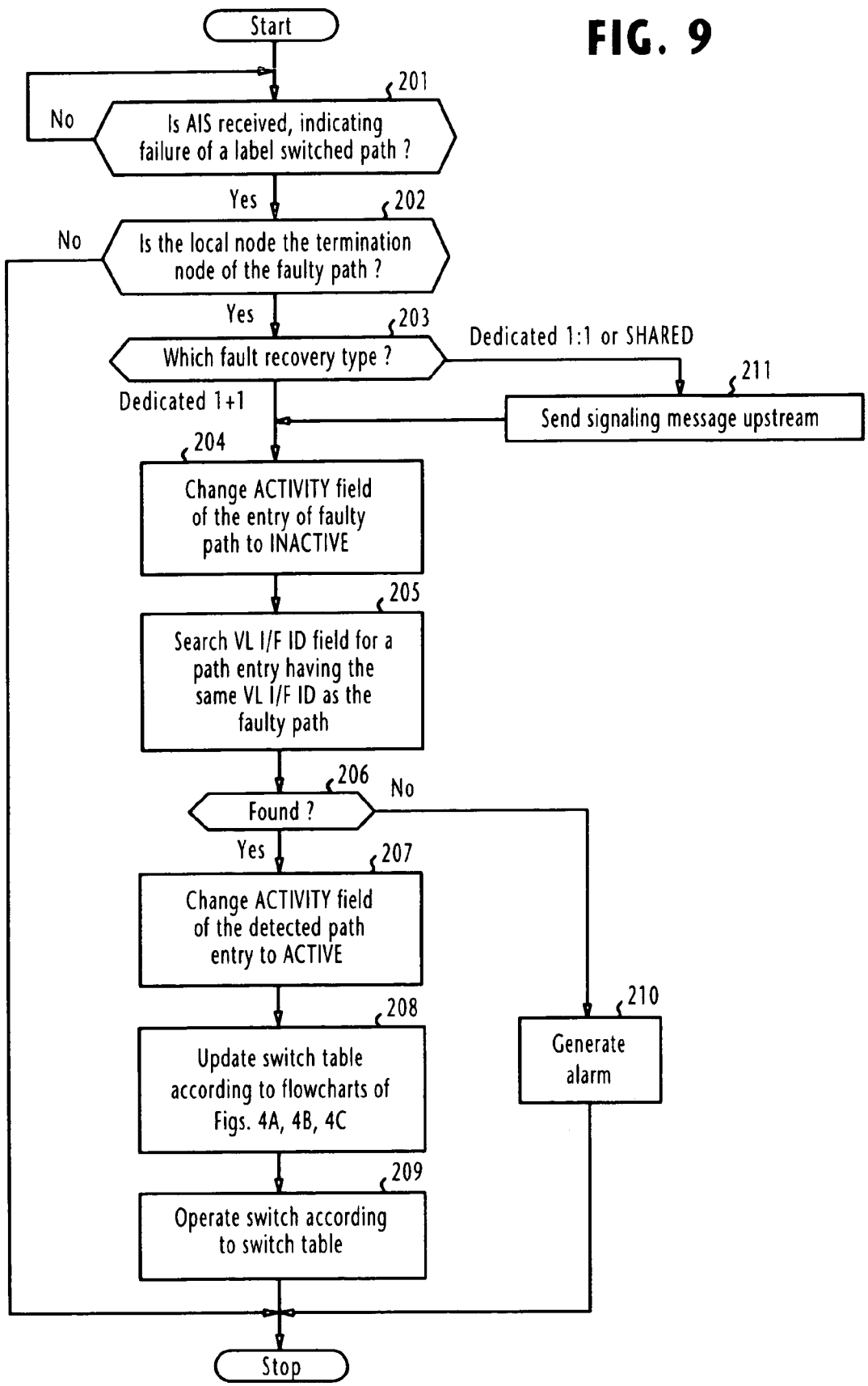
FIG. 9 is a flowchart of the operation of each node when a failure is detected in a working path.

In FIG. 9, when an AIS signal is received on the (step 201), the controller proceeds to decision step 202. If the local node is not the termination node of the faulty path, the controller ignores the message and terminates the routine. If the local node is the termination node of the faulty path, the controller 5 proceeds to step 203 to examine the path recovery type field of the faulty-path table entry and determines which recovery type is indicated. If the path recovery type is DEDICATED 1+1, flow proceeds to step 204 and if the path recovery type is DEDICATED 1:1 or SHARED, flow proceeds to step 211 for sending a signaling message to the network before proceeding to step 204.

At step 204, the content of the ACTIVITY field of the faulty-path entry is changed from ACTIVE to INACTIVE, and the VL I/F ID field is searched for a path entry having the same VL I/F ID as the one contained in the path entry of the faulty path (step 205). If one is found (step 206), the content of the ACTIVITY field of the detected path entry is changed from INACTIVE to ACTIVE (step 207). Therefore, if the termination node C has detected a failure in the working transport path 10, the controller 5 will update the ACTIVITY field of its path table as shown in FIG. 10A.

With the path table being updated, the controller 5 then executes the flowcharts of FIGS. 4A, 4B and 4C to update the switch table (step 208), so that the input port ID changes from C2 to C3 as shown in FIG. 10B, and operates the cross-connect switch 2 according to the updated switch table (step 209).

As a result, the cross-connect switch 2 of node C is reconfigured for switching its traffic path to node D from the working path 10 to the protection path 11. FIG. 10B indicates that an incoming STM-1 signal that begins with the first timeslot now appears at the input port C3 and an outgoing STM-1 signal beginning with the first timeslot is delivered to the node D from the output port C6.

If the decision at step 206 is negative, an alarm is generated (step 210).

In the foregoing description it is assumed that the information carried on the traffic path 12 is an STM-1 signal and each of the transport paths 10, 11 is an STM-4 signal. Therefore, additional three STM-1 signals can be further accommodated in the virtual link between nodes B and C.

Because of the hierarchical structure, the virtual link between nodes B and C sits on a different layer from the layer on which the traffic signal is transmitted. Thus, the bandwidth resource of the virtual link can be arbitrarily determined independently of the bandwidth of the traffic. Hence, the virtual link can be recovered with an arbitrarily chosen granularity. If finer granularity is desired, a narrower bandwidth may be assigned to the virtual link.

Another advantage of the present invention is that the network can be recovered from a node failure which can occur in any transit node between the initiation and termination nodes of a virtual link.

A further advantage of the present invention is that the termination node of a virtual link is not required to perform fault location which is a time-consuming task. The present invention has reduced the task of a termination node to simple functions of detecting the presence of a failure in the virtual link and of performing a switchover operation.

A still further advantage of the present invention is that since a virtual link (i.e., a pair of working and protection transport paths) can be established in any network section where protection is desired, the fault recovery method that must be implemented is only required to support the end-to-end path protection scheme of the initiation and termination nodes. It is not necessary to support other fault recovery methods. Since the two transport paths have a definite initiation point where they diverge and a definite termination point where they converge, the node that performs path splitting, the node that performs path monitoring and the node that performs path switching can be automatically determined and easily identified. Accordingly, the path setup and path switchover operation of these nodes are simplified.

A still further advantage of the present invention is that when a failure occurs in the virtual link it is not necessary at all to update the traffic-path entry of the path table. In other words, the control function of the traffic path can be completely hidden behind the fault recovery operation of the transport path.

Additionally, the physical links that comprise the transport paths are "unprotected" at the link layer. The fault recovery operation on the transport paths would not encounter contention which would otherwise occur with the link layer.

Figure 11:
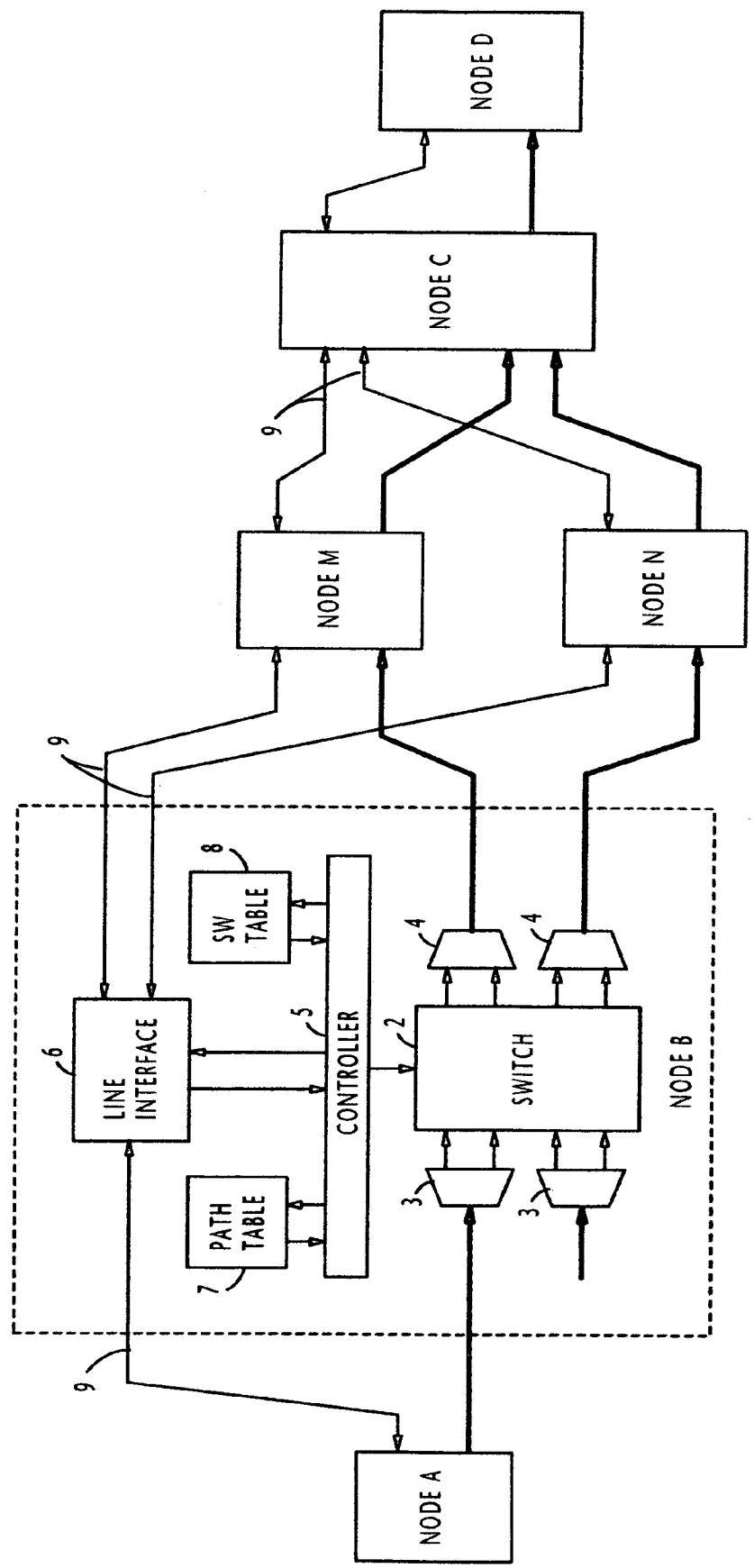
FIG. 11 is a block diagram of a communications network according to another embodiment of the present invention, in which routing and signaling functions are distributed to the network nodes.

FIG. 11 is a block diagram of a distributed network in which the routing functions of the network are distributed among the interconnected nodes. In his embodiment, the nodes B, M, N and C are connected to form a transport network and the nodes A and D are assumed to be the clients of the transport network. Client nodes A and D are connected to the transport network via a user network interface (JNI) and the nodes B, M, N, C are interconnected by a network node interface (NNI).

Line interfaces 6 of adjacent nodes are interconnected via bi-directional control channels. Specifically, the control channel for interconnecting adjacent nodes A and B and the control channel for interconnecting adjacent nodes C and D are UNI control channels for exchanging signaling messages according to a UNI signaling protocol. Request messages (packets) such as path setup or path release are sent from the client nodes A and D to the transport nodes B and C, respectively.

The control channels used to interconnect the adjacent nodes of the transport network are NNI signaling channels on which routing messages are transported according to a routing protocol. A topology database is maintained in each of the transport nodes B, M, N and C so that they know the initiation and termination points of all links, their maximum bandwidths, the available bandwidths, and their link-fault recovery types.

Although the network of FIG. 11 can operate in dedicated 1+1 fault recovery mode, the following is a description of the network operating in a dedicated 1:1 recovery mode.

Client node A initially sends a connection request message over the control channel 9 to the node B to request for the establishment of an STM-1 path, i.e., the traffic path 12, to the client node D, containing the path ID (i.e., "12"), the bandwidth resource (i.e., STM-1), the identifiers of the initiation and termination nodes of the path (i.e., A and D), and the link-fault recovery type (i.e., dedicated 1:1).

In response to this connection request message, the node B determines that transport paths 10 and 11 be set up between nodes B and C and makes the determination of bandwidth (i.e., STM-4) for each of these transport paths. By using its own topology database, the node B provides a route calculation for the paths 10 and 11 so that they form a node-disjoint relationship with each other and that they pass through links whose link-fault recovery type is "unprotected". Therefore, the links comprising the transport paths are not restored at the link layer when a link fault occurs in any of these links. If the node B has determined that a route B-M-C is the working transport path 10 and a route B-N-C is the protection transport path 11, it sends a label request message to node M, containing the path ID (i.e., "10"), a tunnel ID (=B-1, for example), the bandwidth resource (i.e., STM-4), and routing information indicating the identifiers of nodes B, M, C in which the traffic path is to be accommodated, a path recovery type (i.e., dedicated 1:1) and link recovery type (i.e., unprotected), a working/protection indication. Note that the tunnel ID is used to indicate which transport paths form a common virtual link.

Upon receipt of the label request message from node B, the controller 5 of node M creates its own path table 7 by setting it with the information contained in the received message, and then retransmits a copy of the message to node C.

Node C responds to this message by creating its own path table in the same manner as node M has performed on the received message. Since the node C knows that it is the termination point of the working transport path 10 from the routing information contained in the message, the label request message is no longer transmitted downstream. Node C assigns VL I/F ID=C-VL1 to the working transport path 10 and sets this ID into its path table (see FIG. 15A). Node C makes a search through its topology database and selects an unprotected link (C2, for example) having a sufficient available bandwidth for a STM-4 path and determines a timeslot (i.e., ID=1, for example) as a starting slot of four continuous STM-1 signals. Node C sets the link's interface identifier C2 into the UPSTREAM I/F ID field and the timeslot ID into the UPSTREAM LABEL field of the path table (FIG. 15A). Subsequently, the node C transmits a label assignment message to node M, containing the assigned UPSTREAM I/F ID (=C2) and the UPSTREAM LABEL (=1) as well as the information contained in the received label request message.

On receiving the label assignment message from node C, the node M creates its own path table by writing the UPSTREAM I/F ID and UPSTREAM LABEL contained in the message into the DOWNSTREAM I/F ID and DOWNSTREAM LABEL fields of the path table, respectively. Since the node M knows that port M7 is connected to port C2 (see FIG. 2), port ID=M7 is set in the DOWNSTREAM I/F ID field of its path table (FIG. 13A). Node M determines the link and timeslot numbers to be assigned to this path in the same manner as node C has determined its link and timeslot and writes the determined identifiers into the UPSTREAM I/F ID and UPSTREAM LABEL fields of its path table, respectively, and then rewrites the corresponding identifiers of the received label assignment message with the determined identifiers and sends it to node B.

Node B performs a similar process on the label assignment messaged received from the node M, but does not transmit the message further to the client node A as the message indicates that node B is the initiation point of the path 10. Node B assigns B-VL1 to the path 10 and sets it into the VL I/F field of its own path table (FIG. 12A).

With the working transport path 10 being established, the node B proceeds to establish the protection transport path 11 by sending a label request message to node N, using the same tunnel ID (=B-1) as that used in the path 10. Data associated with the protection path 11 are set into the second entry of the path table of nodes B and C as indicated in FIGS. 12A and 15A, and the node N creates its own path table as shown in FIG. 14A.

When the client node A sends a signaling message to node B, for requesting the establishment of a connection to the node D, the path tables of initiation and termination nodes B and C are updated according to the data contained in the connection request message.

Nodes B, M, N and C proceed to create their switch table 8 by performing the routine as described with reference to the flowcharts of FIGS. 4A, 4B and 4C. As a result, switch tables are created in the nodes B, M and C as indicated in FIGS. 12B, 13B and 15B, but no switch table is created in the node N (FIG. 14B). Since the path recovery type of the transport path 10 is assumed to be dedicated 1:1, the data associated with the protection path 11 are not set into the switch table. Therefore, switching data is set into only one entry of each of these switch tables.

If the node C detects a failure in the working path 10, it changes the ACTIVITY field of its path table to "INACTIVE" by executing the flowchart of FIG. 9 and changes the INPUT PORT ID field of its switch table to C3 according to the flowcharts of FIGS. 4A-4C, as indicated in FIG. 16A. The node C transmits a signaling message to node N. In response, the node N changes the ACTIVITY field of its path table to "ACTIVE", creates its own switch table according to FIGS. 4A-4C, as shown in FIG. 16B, and transmits the signaling message to node B. Similar to the node C, the node B updates the ACTIVITY field of its path table and changes the OUTPUT PORT ID field of its switch table to B7 as indicated in FIG. 16C.

Figure 17A:
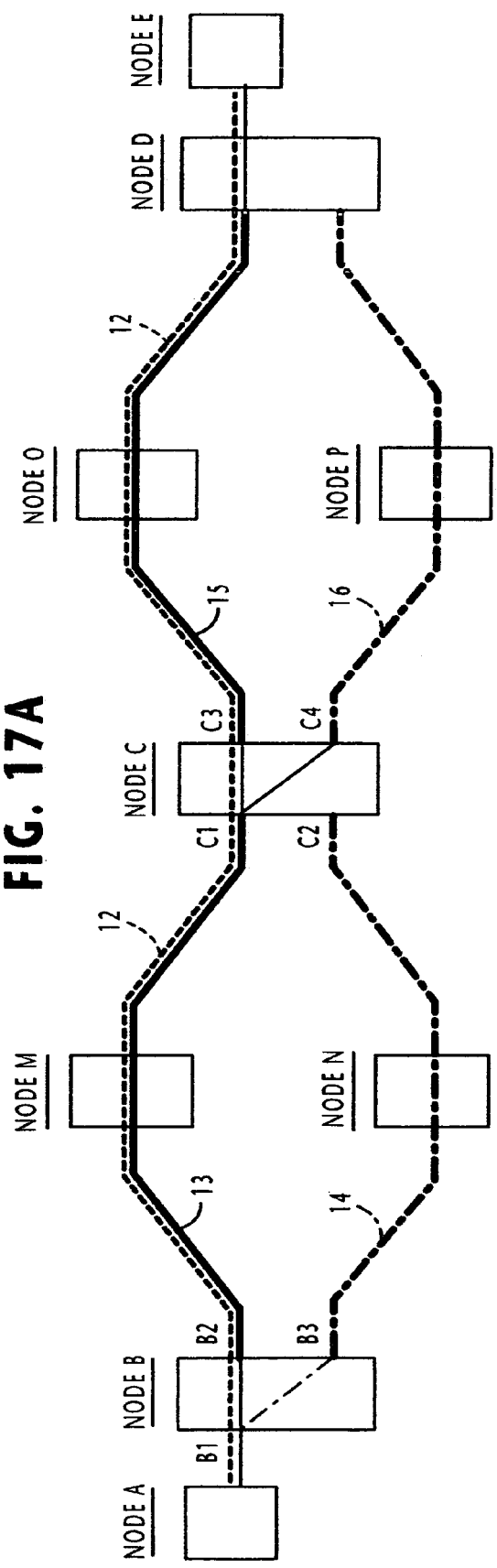
FIGS. 17A and 17B are block diagrams of a multi-domain communications network showing normal and faulty states, respectively, of the working transport path.

Transport paths can be concatenated as shown in FIG. 17A. In this configuration, nodes A and F are client nodes interconnected by a transport network comprising nodes B, M, N, C, O, P and D, interconnected by optical links. The transport network is divided into a first section B-C and a second section C-D so that nodes B and C are respectively the initiation and termination nodes of transport paths 13, 14, and the nodes C and D are respectively the initiation and termination nodes of transport paths 15, 16. The termination node of each network section monitors the working transport path.

Figure 17B:
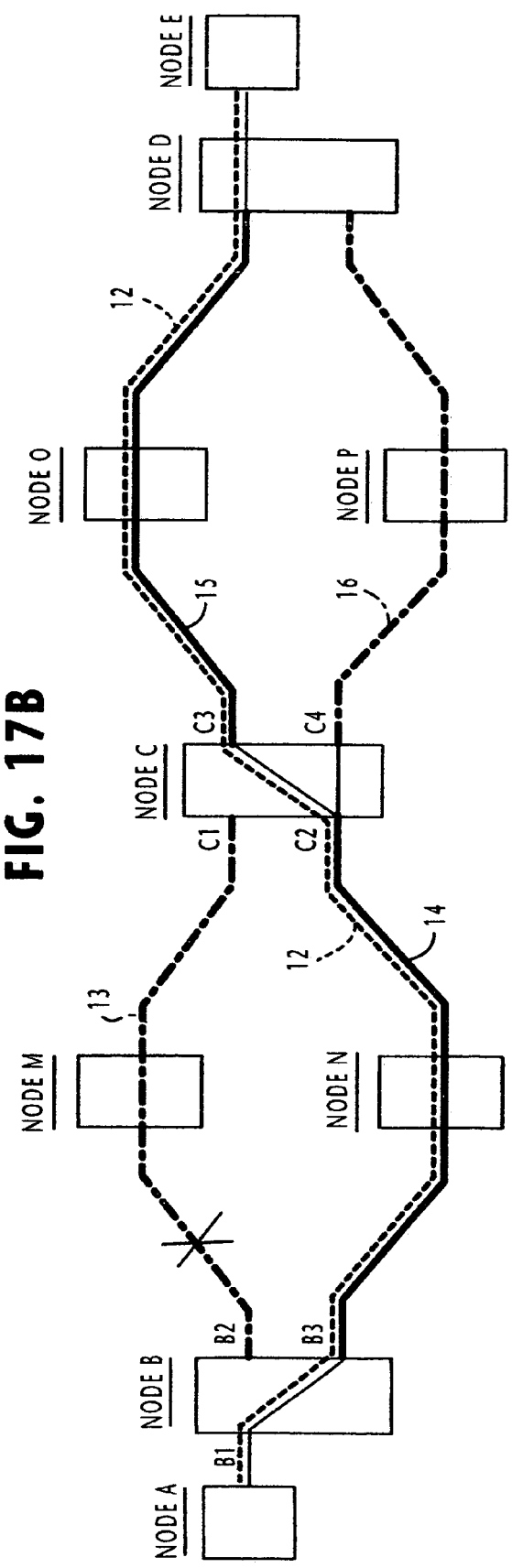

If the path recovery type of the network is dedicated 1+1, the signal on the traffic path 12 from client node A is split into two in the node B and respectively transmitted over the transport paths 13 and 14 to the node C, where the signal from the path 13 (i.e., the input port C1) is split and respectively sent from the output ports C3 and C4 over the transport paths 15 and 16 to the node D. Node D transmits the signal on path 15 to the client node E. When a failure occurs in the path 13 as indicated in FIG. 17B, the node C dears the connection between ports C1 and C4 and reestablishes connections so that the signal on path 14 (i.e., the input port C2) is supplied to the output ports C3 and C4.

In this network configuration, the granularity of fault recovery can be independently determined for network sections B-C and C-D. For example, the section B-C is implemented with two STM-4 paths, while the section C-D is implemented with two paths of a different SDH layer if finer granularity is desired for section C-D. Another advantage of this invention is that, compared to a network where the nodes B and D were interconnected by a single span of transport paths, the time taken to recover from a failure can be reduced since the fault recovery time is proportional to the length of each network section through which signaling messages are transmitted for restoration. This is particularly advantages if the fault recovery type is N:M protection mode.

Fault recovery contention between an SDH layer and a wavelength layer can be avoided in a communications network of FIG. 18.

In this network, client nodes A and H are interconnected by a transport network comprising nodes B, M, N, C, D, O, P, E, F, Q, R and G. The network is segmented into a plurality of domains 50, 51 and 52, so that nodes B, M, N, C comprise the domain 50, nodes D, O, P, E comprise the domain 51, and nodes F, Q R, G comprise the domain 52.

In each of these domains, adjacent nodes are interconnected by optical links. Nodes M, 0 and Q are interconnected by inter-domain direct links 60 and 61 and nodes N, P and R are interconnected by inter-domain direct links 62 and 63. Nodes C and D are interconnected by an optical link 64 and nodes E and F are interconnected by an optical link 65, In the domain 51, all adjacent nodes are interconnected by optical links having wavelengths W1, W2, W3, W4 as illustrated.

Initially, the node B performs a route calculation for routes to node C and sends a signaling message to node C to establish a working transport path 13 via node M and a protection transport path 14 via node N, using respective links whose link recovery type is "unprotected". Using a routing protocol, the nodes B and C advertise these paths as a virtual link having virtual link (VL) interface identifiers (B-VL1) and (C-VL1), respectively, and their link recovery type as "dedicated 1+1".

Node D performs route calculation for working and protection transport paths 15 and 16 in a similar manner to that of node C. Then, the node D sends a label request message to establish the calculated paths 15 and 16. Since the paths 15 and 16 are wavelength paths, optical fiber IDs (=W1 and W2) are indicated in the respective entries of the DOWNSTREAM I/F ID field of node-D path table (FIG. 19) and port identifiers (=D2 and D3) are indicated in the respective path entries of the DOWNSTREAM LABEL field.

For the path 15, for example, the node E performs a similar process and creates its own path table in which it assigns optical fiber ID=W3 and places this optical fiber ID in its path table entry of the UPSTREAM I/F ID field, and places port ID (=E2) in its path table entry of the UPSTREAM LABEL field and sends a label assignment message upstream and a label request message downstream.

Node O responds to this label assignment message by writing W3 into the DOWNSTREAM I/F ID field of its own path table and output port ID (=O2) into the DOWNSTREAM LABEL field, and sends a label assignment message upstream, indicating W1 and O1 in the UPSTREAM I/F ID and UPSTREAM LABEL fields of the message, respectively.

Node D responds to the label assignment message from node O by writing W1 and D2 into the DOWNSTREAM I/F ID and DOWNSTREAM LABEL fields of its own path table.

Transport paths 15 and 16 form a single virtual link, which is advertised to all network nodes as having an interface identified as D-VL1 as viewed from node D and an interface identified as E-VL1 as viewed from node E. Because of the contention-free characteristic of the fault recovery scheme of the present invention, the link recovery type of the transport paths 15, 16 is "unprotected" at the link layer and their path recovery type is "dedicated 1+1" at the SDH layer.

In the same way, the node F performs a route calculation and establishes transport paths 17 and 18 to node G, which are advertised to all network nodes as having VL interface identifiers F-VL3 and G-VL3 as viewed from nodes F and G, respectively.

In response to the advertisement message from node F, the node C performs a route calculation for a transport path (SDH path) 19 to the node F, exclusively using links whose link recovery type is "dedicated 1+1" and finds a route C-D-O-E-F via the wavelength path 15 and sends a signaling message along this route for setting up the path. As indicated in FIG. 19, the path recovery type of the SDH path 19 is specified as "unprotected". Then node C advertises the SDH path 19 as a virtual link which has VL interface identifiers C-VL4 and F-VL4 as viewed from nodes C and P, respectively.

Since the link recovery type of all the links is "dedicated 1+1", the link recovery type of the transport path (virtual link) 19 is "dedicated 1+1".

The transport network is now ready to accept requests from the client nodes. When the client node A sends a signaling message to node B for setting up the traffic path 12 to the client node H, the node B uses links of the dedicated 1+1 recovery type to node G to perform a route calculation. The result of this calculation would result in the establishment of a route A-B-C-F-G-H by exchanging signaling messages between nodes B and G, so that the path 12 has its sections B-C, C-F and F-G accommodated respectively in the protected VL-1 formed by paths 13 and 14, the unprotected VL formed by path 19, and the protected VL-2 formed by paths 17 and 18.

When the traffic path 12 has been set up in the network, the nodes C, E and G monitor the working paths 13, 15 and 17, respectively. Since the path 19 is of unprotected path recovery type, the termination node F of this path performs no monitoring on this path. If the wavelength path should fail, fault recovery is performed at the wavelength layer. Since the optical links W1 to W4 are unprotected, no fault recovery contention occurs with the SDH layer. Since the links 64 and 65 are of "dedicated 1+1" type, while the path 19 is unprotected, no fault recovery contention occurs if any of these links should fail.

The provision of the path 19 is advantageous if it is desired to explicitly perform the monitoring of a section of a traffic path such as the section C-F or desired to make such a section invisible to the client node A.

If the node B fails to discover a high-speed fault recovery route to the node G using only dedicated 1+1 links as illustrated in FIG. 18, the node B then performs a route calculation for a low-speed recovery path using only "unprotected" links for "disjoint" paths 70 and 71 to the node G, as shown in FIG. 20. If a route B-M-O-Q-G connected by links 60 and 61 is found for the path 70 and a route B-N-P-R-G connected by links 62 and 63 is found for the path 71, the node B sends signaling messages over these routes to indicate that the path recovery type of the paths 70 and 71 is "dedicated 1+1". Node B sets the paths 70 and 71 as a "dedicated 1+1" virtual link in its own topology database. Node B then performs a calculation for a "dedicated 1+1" route to the node G and finds the paths 70 and 71. Node B sends signaling messages over the detected paths to establish the traffic path 12.

In a network where inter-domain direct links such as links 60, 61, 62, 63 are not provided, the link recovery type of inter-domain links 64 and 65 may be set in a "DON'T CARE" mode. With this recovery mode setting, these links can be used as candidates in route calculations of any fault recovery mode.

According to another aspect of the present invention, a multi-domain network is illustrated in FIG. 21, in which each domain operates according to the domain-specific routing protocol. Each node of this network has a topology database of its own domain and knows about the edge nodes to which the client nodes of the domain are connected, and about the transit nodes of its own domain through which a connection is set up to a destination node outside of its own domain. Border nodes of each domain know about their own domain identifier and the identifiers of transit nodes through which a connection is set up to a destination node of another domain. In such a multi-domain network, the present invention enables all domains of the network to consistently operate in a 1+1 protection mode on the traffic path 12.

In a multi-domain network as shown in FIG. 21, the client node A initially sends a signaling message (i.e., user-to-network-interface signaling) to the node B for requesting the establishment of traffic path 12 to the client node H over a "1+1 protection" route. Since the node B knows that the route must pass through the node C in order to reach the destination, it attempts to find a route to the node C on which "1+1 protection" is performed. Since such a route is not available, the node B performs a route calculation for a pair of mutually "disjoint" paths 13 and 14 to the node C and establishes these paths by sending a signaling message (using internal network-to-network interface signaling) to the node C. After setting the paths 13 and 14 into its own topology database as a virtual link, the node B recalculates a route for the traffic path 12, which would result in the detection of a route that passes through this VL to the node C. Then, the node B transmits a label request message to the node C, containing a path ID (=B-1), the initiation point of path 12 (=A), the termination point of path 12 (=H), routing information (B-C) to the node C, the bandwidth required, and the link recovery type (=dedicated 1+1).

Since the node C knows that for a route to reach the destination node H such a route must pass through domain 51, it responds to the label request message from the node B by sending a label request message (using external network-to-network interface signaling) to the node D, containing the same information as that of the received message except for the routing data.

Since the node D knows that for a route to reach the destination node H the route must pass through the node E, it performs route calculation for paths 15 and 16 and establishes these paths as a virtual link and sends a label request message to the node E for requesting the traffic path 12 in the same manner as the node B has performed for establishing the paths 13 and 14.

Since the node E knows that for a route to reach the destination node H the route must pass through domain 52, it responds to the label request message from the node D by sending a label request message to the node F.

Knowing that the destination node H is connected to the node G, the node F performs route calculation for paths 17 and 18 and establishes these paths as a virtual link and sends a label request message to the node G for requesting the traffic path 12 in the same way the path 12 has been established over the paths 13, 14 and 15, 16. Node G, on receiving the label request message from node F, retransmits it to the destination node H.

In response, the node H assigns an UPSTREAM I/F ID and an UPSTREAM LABEL to the traffic path 12 and sends a label assignment message to the node G, containing the assigned information.

Node G translates the informed label and ID to DOWNSTREAM I/F ID and DOWNSTREAM LABEL and stores the translated ID and label information into the path-table entry of traffic path 12. Node G assigns an UPSTREAM I/F ID and an UPSTREAM LABEL to the traffic path 12 according to the information contained in the label request message it has received from the node F, and sends a label assignment message to the node F, containing the assigned information.

On receiving the label assignment message from node G, the node F translates the upstream information contained in it to DOWNSTREAM I/F ID and DOWNSTREAM LABEL and stores them into its own path table and assigns an UPSTREAM I/F ID and an UPSTREAM LABEL to the traffic path 12 according to the information contained in the label request message it has received from the node E, and sends a label assignment message to the node E, containing the assigned information.

A similar process is successively repeated in the domains 51 and 50, so that in the nodes E, D, C and B interface IDs and labels are respectively assigned to the traffic path 12. Finally, the node B sends a label assignment message to the client node A, containing the UPSTREAM I/F ID and UPSTREAM LABEL it has assigned to the traffic path 12.

Client node A translates the received ID and label to DOWNSTREAM I/F ID and DOWNSTREAM LABEL and stores them into the path-table entry of the traffic path 12.

Monitoring operation now begins at nodes C, E and G respectively on the working paths 13, 15 and 17. In his way, 1+1 protection of the traffic path 12 can be implemented in the domains 50, 51 and 52.

What is claimed is:

1. A communications network comprising:
   first and second nodes interconnected by communication links; and
   a traffic path established between a source node and a destination node;
   each of said first and second nodes including routing control means for establishing first and second transport paths on a first fault recovery layer between said first and second nodes,
   said first node further including a database for storing identities of said first and second transport paths as a single virtual link as viewed from said source node,
   said first and second nodes accommodating said traffic path on a second fault recovery layer through said first transport path, and accommodating said traffic path on said second fault recovery layer through said second transport path when said first transport path is not working properly;
   wherein each of said first and second nodes comprises:
      a first table memory for storing routing data of said first and second transport paths and said traffic path;
      a second table memory for storing switching data derived from said routing data;
      a switch for terminating said first and second transport paths; and
      a controller for establishing a connection in said switch according to said switching data so that said traffic path is accommodated in said first transport path,
      said controller responding to an occurrence of a failure in said first transport path for updating said routing data, updating the switching data according to the updated routing data and reestablishing a connection in said switch according to the updated switching data so that said traffic path is accommodated in said second transnort path.

2. The communications network of claim 1, wherein said first and second fault recovery layers are hierarchically structured in such a relationship that no contention occurs between the first and second fault recovery layers when a failure occurs in said first and second transport paths.

3. The communications network of claim 1, wherein said first node is an initiation node of said traffic path and said second node is a termination node of said traffic path.

4. The communications network of claim 1, wherein said first and second transport paths do not share a common physical link.

5. The communications network of claim 4, wherein said first and second transport paths do not pass through a common node other than said first and second nodes.

6. The communications network of claim 1, wherein said second node is downstream of said first transport path and monitors said first transport path for detecting a failure.

7. The communications network of claim 1, wherein said first node supplies a signal on said traffic path to said first and second transport paths simultaneously and wherein said second node receives said signal from said first transport path when the first transport path is working properly and receives said signal from said second transport path when the first transport path is not working properly.

8. The communications network of claim 1, wherein said first node supplies a signal on said traffic path to said first transport path and said second node receives said signal from said first path when the first transport path is working properly, and wherein said first node supplies said signal to said second transport path and said second node receives said signal from said second transport path when said first transport path is not working properly.

9. The communications network of claim 1, wherein said first node supplies a signal on said traffic path to said first transport path and said second node receives said signal from said first transport path when the first transport path is working properly, and wherein said first node supplies said signal to said first and second transport paths simultaneously and said second node receives said signal from said second transport path when said first transport path is not working properly.

10. The communications network of claim 1, wherein each of said first and second transport paths is established on an unprotected transmission medium.

11. The communications network of claim 1, wherein said controller derives said switching data from said routing data by translation from a control plane of said network to a transport plane of said network.

12. The communications network of claim 11, wherein said control plane is a GMPLS (generalized multi-protocol label switching) system and said transport plane is an SDH/SONET system.

13. The communications network of claim 11, wherein said controller updates said routing data when said failure is detected in said first transport path, updates said switching data according to the updated routing data and reestablishes said connection according to the updated switching data.

14. The communications network of claim 1, wherein each of said first and second transport paths has a bandwidth resource greater than a bandwidth resource of said traffic path.

15. The communications network of claim 1, wherein each of said first and second transport paths is a wavelength path.

16. A multi-domain communications network comprising:
a plurality of network domains interconnected by inter-domain links, each of said network domains including first and second nodes interconnected by inter-node links; and
a traffic path established between a source node and a destination node,
the first node of each of said domains establishing first and second parallel transport paths on a first fault recovery layer to the second node of the domain and including a database for storing identities of said first and second parallel transport paths as a single virtual link as viewed from said source node, and accommodating said traffic path on a second fault recovery layer through the first transport path of the domain,
the first and second nodes of each of said domains accommodating said traffic path in the second transport path of the domain when the first transport path of the domain is not working properly.

17. The multi-domain communications network of claim 16, wherein said first and second fault recovery layers are hierarchically structured in such a relationship that no contention occurs between the first and second fault recovery layers when a failure occurs in said first and second transport paths.

18. The multi-domain communications network of claim 16, wherein each of said nodes comprises:
a first table memory for storing routing data of said first, second and traffic paths;
a second table memory for storing switching data derived from said routing data;
a switch for terminating said first and second transport paths; and
a controller for establishing a connection in said switch according to said switching data so that said traffic path is accommodated in said first transport path,
said controller responding to an occurrence of a failure in said first transport path for updating said routing data, updating the switching data according to the updated routing data and reestablishing a connection in said switch according to the updated switching data so that said traffic path is accommodated in said second transport path.

19. The multi-domain communications network of claim 18, wherein said controller derives said switching data from said routing data by translation from a control plane of said network to a transport plane of said network.

20. The multi-domain communications network of claim 19, wherein said controller updates said routing data when said failure is detected in said first transport path, updates said switching data according to the updated routing data and reestablishes said connection according to the updated switching data.

21. The multi-domain communications network of claim 16, wherein fault recovery type of the inter-node links of each of said domains is unprotected, and fault recovery type of said first and second transport paths of each of said domains is dedicated 1+1.

22. The multi-domain communications network of claim 16, wherein fault recovery type of the inter-node links of each of said domains is unprotected, and fault recovery type of said first and second transport paths of each of said domains is dedicated 1:1.

23. The multi-domain communications network of claim 16, wherein fault recovery type of the inter-node links of each of said domains is unprotected, and said first and second transport paths of each of said domains are of shared fault recovery type.

24. The multi-domain communications network of claim 16, wherein each of said inter-domain links is of don't care fault recovery type.

25. The multi-domain communications network of claim 16, wherein said first fault recovery layer is a wavelength layer and said second fault recovery layer is a TDM (time division multiplex) layer.

26. The multi-domain communications network of claim 16, wherein said domains comprise first and second domains and an intermediate domain connected between the first and second domains, and wherein said first, second and intermediate domains establish a third transport path on a third fault recovery layer between the second node of said first domain and the first node of said third domain through the first transport path of said intermediate domain.

27. The multi-domain communications network of claim 26, wherein the first fault recovery layer of said intermediate domain is a TDM layer and said third fault recovery layer is a wavelength layer.

28. The multi-domain communications network of claim 16, wherein the first and second nodes of each of said domains transmits a request message downstream to, and receives the request message from, an adjacent node for establishing said first and second transport paths in each of the domains and specifying a particular fault recovery type and a bandwidth resource of the established transport paths and transmits a return message upstream to, and receives the return message from, an adjacent node,
 each of said nodes setting the fault recovery type specified in the received request message into a first table memory and setting an input and output connectivity in said first table memory by associating information contained in the received request message and information contained in the received return message,
 each of said nodes creating a switch table according to information contained in the first table memory,
 each of said nodes including a switch for establishing a connection according to said switch table for transporting signals of said traffic path.

29. The multi-domain communications network of claim 16, wherein the first and second nodes of each of said domains transmits a first request message downstream to, and receives the first request message from, an adjacent node for establishing said first and second transport paths using protected inter-domain links,
 wherein each of said nodes determines whether or not a transport path specified by the received request message is discovered, and
 wherein, if the specified transport path is not discovered, each of said nodes transmits a second request message downstream to, and receives the second request message from, an adjacent node for establishing said first and second transport paths using unprotected inter-domain links.

30. The multi-domain communications network of claim 16, wherein each of said first and second transport paths is a wavelength path.

31. A fault recovery method for a communications network in which first and second nodes are interconnected by communication links, the method comprising the steps of:
 establishing first and second parallel transport paths on a first fault recovery layer between the first and second nodes;
 storing identities of said first and second parallel transport paths in a database as a single virtual link as viewed from a source node;
 establishing a traffic path between a source node and a destination node;
 accommodating said traffic path on a second fault recovery layer through said first transport path; and
 monitoring said first transport path, at said second node, and accommodating said traffic path on said second fault recovery layer through said second transport path when a failure is detected in said first path;
 storing routing data of said first, second and traffic paths in a first table memory:
 storing switching data derived from said routing data in a second table memory;
 terminating said first and second transport paths to a switch;
 establishing a connection in said switch according to said switching data so that said traffic path is accommodated in said first transport path;
 updating said routing data when a failure occurs in said first transport path;
 updating the switching data according to the updated routing data; and reestablishing a connection in said switch according to the updated switching data so that said traffic path is accommodated in said second transport path.

32. The fault recovery method of claim 31, wherein said first and second fault recovery layers are hierarchically structured in such a relationship that no contention occurs between the first and second fault recovery layers when a failure occurs in said first and second transport paths.

33. The fault recovery method of claim 31, further comprising the steps of:
 supplying a signal of said traffic path from said first node to said first and second transport paths simultaneously, and receiving the signal at said second node from said first transport path when the first transport path is working properly; and
 receiving said signal at said second node from said second transport path when said failure is detected in said first transport path.

34. The fault recovery method of claim 31, further comprising the steps of:
 supplying a signal of said traffic path from said first node to said first transport path and receiving said signal at said second node from said first transport path when the first transport path is working properly; and
 supplying said signal from said first node to said second transport path and receiving said signal at said second from said second transport path when said failure is detected in said first transport path.

35. The fault recovery method of claim 31, further comprising the steps of:
 supplying a signal of said traffic path from said first node to said first transport path and receiving said signal from said first transport path at said second node when the first transport path is working properly; and
 supplying said signal to said first and second transport paths simultaneously from said first node and receiving said signal from said second transport path at said second node when said failure is detected in said first transport path.

36. The fault recovery method of claim 31, wherein step (b) comprises deriving said switching data from said routing data by translation from a control plane of said network to a transport plane of said network.

37. The fault recovery method of claim 36, wherein said control plane is a GMPLS (generalized multi-protocol label switching) system and said transport plane is an SDH/SONET system.

38. The fault recovery method of claim 36, further comprising the steps of:

updating said routing data when said failure is detected in said first transport path;

updating said switching data according to the updated routing data; and reestablishing said connection according to the updated switching data.

39. The fault recovery method of claim 31, wherein said communications network is a multi-domain communications network wherein a plurality of network domains are interconnected by inter-domain links, and further comprising the steps of:

transmitting a request message from each of said nodes downstream to, and receiving the request message from, an adjacent node for establishing said first and second transport paths in each of the domains by specifying a particular fault recovery type and a bandwidth resource of the established transport paths;

transmitting a return message upstream to, and receives the return message from, an adjacent node;

setting the fault recovery type specified in the received request message into a first table memory of each node and setting an input and output connectivity in said first table memory by associating information contained in the received request message and information contained in the received return message;

creating a second table memory, in each node, according to information contained in the first table memory of the node; and establishing a connection in each of said nodes according to the second table memory of the node for transporting signals on said traffic path.

40. The fault recovery method of claim 31, wherein said communications network is a multi-domain communications network wherein a plurality of network domains are interconnected by inter-domain links, and further comprising the steps of:

transmitting a first request message from each of said nodes downstream to, and receives the first request message from, an adjacent node for establishing said first and second transport paths using protected inter-domain links;

determining whether or not a transport path specified by the received request message is discovered; and if the specified transport path is not discovered, transmitting a second request message from each node downstream to, and receiving the second request message from, an adjacent node for establishing said first and second transport paths using unprotected inter-domain links.

41. A fault recovery method for a multi-domain communications network, wherein the network comprises a plurality of network domains interconnected by inter-domain links and wherein each of the network domains includes first and second nodes interconnected by inter-node links, the method comprising the steps of:

establishing, in each of said domains, first and second parallel transport paths on a first fault recovery layer from the first node to the second node;

storing identities of said first and second parallel transport paths as a single virtual link in a database as viewed from said source node;

establishing a traffic path between a source node and a destination node;

accommodating said traffic path on a second fault recovery layer through the first transport path of the domain; and accommodating said traffic path on the second fault recovery layer through the second transport path of one of the domains when the first transport path of said one domain is not working properly.

42. The fault recovery method of claim 41, wherein said first and second fault recovery layers are hierarchically structured in such a relationship that no contention occurs between the first and second fault recovery layers when a failure occurs in said first and second transport paths.

43. The fault recovery method of claim 41, further comprising the steps of:

transmitting from the first and second nodes of each of said domains a request message downstream to, and receiving the request message from, an adjacent node for establishing said first and second transport paths in each of the domains and specifying a particular fault recovery type and a bandwidth resource of the established transport paths and transmits a return message upstream to, and receives the return message from, an adjacent node;

setting the fault recovery type specified in the received request message into a first table memory of each of said nodes and setting an input and output connectivity in said first table memory by associating information contained in the received request message and information contained in the received return message;

creating a switch table of each of said nodes according to information contained in the first table memory; and establishing a connection in each of said nodes according to said switch table for transporting signals of said traffic path.

44. The fault recovery method of claim 41, further comprising the steps of:

transmitting a first request message downstream to, and receiving the first request message from, an adjacent node for establishing said first and second transport paths using protected inter-domain links;

determining whether or not a path specified by the received request message is discovered; and if the specified path is not discovered, transmitting a second request message downstream to, and receiving the second request message from, an adjacent node for establishing said first and second transport paths using unprotected inter-domain links.

* * * * *

UNITED STATES PATENT AND TRADEMARK OFFICE
CERTIFICATE OF CORRECTION

| | | |
|---|---|---|
| PATENT NO. | : 7,372,806 B2 | Page 1 of 1 |
| APPLICATION NO. | : 10/283241 | |
| DATED | : May 13, 2008 | |
| INVENTOR(S) | : Suemura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1546 days.

Signed and Sealed this

Ninth Day of November, 2010

David J. Kappos
*Director of the United States Patent and Trademark Office*